(12) United States Patent
Hofmann

(10) Patent No.: US 10,711,774 B2
(45) Date of Patent: Jul. 14, 2020

(54) MEMBRANE PUMP, IN PARTICULAR FOR USE IN THE EXHAUST GAS SYSTEM OF AN INTERNAL COMBUSTION ENGINE, AND INTERNAL COMBUSTION ENGINE COMPRISING A MEMBRANE PUMP

(71) Applicant: Arno Hofmann, Gelnhausen (DE)

(72) Inventor: Arno Hofmann, Gelnhausen (DE)

( * ) Notice: Subject to any disclaimer, the term of this patent is extended or adjusted under 35 U.S.C. 154(b) by 221 days.

(21) Appl. No.: 15/552,448

(22) PCT Filed: Feb. 11, 2016

(86) PCT No.: PCT/EP2016/052871
§ 371 (c)(1),
(2) Date: Aug. 21, 2017

(87) PCT Pub. No.: WO2016/134975
PCT Pub. Date: Sep. 1, 2016

(65) Prior Publication Data
US 2018/0045192 A1    Feb. 15, 2018

(30) Foreign Application Priority Data
Feb. 27, 2015    (EP) .................................... 15157064

(51) Int. Cl.
*F04B 45/04*    (2006.01)
*F04B 45/053*    (2006.01)
*F02B 33/42*    (2006.01)

(52) U.S. Cl.
CPC ............ *F04B 45/043* (2013.01); *F02B 33/42* (2013.01); *F04B 45/053* (2013.01)

(58) Field of Classification Search
CPC ........ F02B 29/00; F02B 33/42; F04B 45/043; F04B 45/053
See application file for complete search history.

(56) References Cited

U.S. PATENT DOCUMENTS 3,093,086 A    6/1963    Altoz et al.
3,738,622 A *  6/1973    Tuckey ................... F02M 1/10
                                                       261/35

(Continued)

FOREIGN PATENT DOCUMENTS

DE    102006055556 A1    6/2007
DE    102011003505 A1    8/2012

(Continued)

*Primary Examiner* — Jason D Shanske
*Assistant Examiner* — Matthew T Largi
(74) *Attorney, Agent, or Firm* — Weitzman Law Offices, LLC

(57) ABSTRACT

A membrane pump (1, 1', 1"), in particular for use in the exhaust gas tract of a combustion engine (70), comprising a pressure housing (2), the internal volume (4) of which is subdivided by a number of resiliently deformable membranes (6) into a plurality of sub-volumes (8, 10) separated from one another on the gas side, wherein a biasing force is applied to the or each membrane (6) in such a way that in the pressure-free state the sub-volume (8) forming the primary side has a minimum value in relation to the deformability of the or each membrane (6), is to act so as particularly to increase effectiveness during use in the exhaust system of a combustion engine (70). For this purpose, according to the invention, a leaf spring (36) is provided as a restoring spring for applying the biasing force to the membrane (6).

20 Claims, 12 Drawing Sheets

(56) References Cited

U.S. PATENT DOCUMENTS

| | | | | |
|---|---|---|---|---|
| 4,168,687 | A | * | 9/1979 | Kurahashi .............. F02M 37/20 |
| | | | | 123/510 |
| 5,197,417 | A | * | 3/1993 | Tuckermann ........... B27B 17/08 |
| | | | | 123/179.14 |
| 5,197,418 | A | * | 3/1993 | Wissmann ........... F02M 59/107 |
| | | | | 123/179.14 |
| 6,216,453 | B1 | * | 4/2001 | Maurer ..................... F01N 3/32 |
| | | | | 60/304 |
| 6,446,611 | B2 | * | 9/2002 | Ishikawa .............. F02M 37/046 |
| | | | | 123/509 |
| 2002/0078909 | A1 | * | 6/2002 | Knaus .................... F02B 63/02 |
| | | | | 123/73 CB |

FOREIGN PATENT DOCUMENTS

| | | |
|---|---|---|
| FR | 1208347 A | 2/1960 |
| JP | S5445806 A | 4/1979 |
| JP | S5576876 U | 5/1980 |
| JP | H04101057 A | 4/1992 |

\* cited by examiner

MEMBRANE PUMP, IN PARTICULAR FOR USE IN THE EXHAUST GAS SYSTEM OF AN INTERNAL COMBUSTION ENGINE, AND INTERNAL COMBUSTION ENGINE COMPRISING A MEMBRANE PUMP

The invention relates to a membrane pump, in particular for use in the exhaust gas tract of a combustion engine, comprising a pressure housing, the internal volume of which is subdivided by a number of resiliently deformable membranes into a plurality of sub-volumes separated from one another on the gas side, wherein a biasing force is applied to the or each membrane in such a way that in the pressure-free state the sub-volume forming the primary side has a minimum value in relation to the deformability of the or each membrane. It further relates to a combustion engine comprising a number of cylinders in each of which a working piston, acting on a shared crankshaft, is guided, wherein the combustion chamber of the or each cylinder is connected to a gas inlet system via an actuable inlet valve system on the inlet side and to an exhaust system via an actuable outlet valve system on the outlet side.

Membrane pumps can be used in wide ranges of technical applications, applications in relation to combustion engines having already been discussed. Thus for example FR 1 031 061 describes a gas-operated membrane pump which is screwed into the spark plug hole of an engine cylinder head. When the engine is turning, the membrane pump is driven by the pressure pulses of the corresponding cylinder and pumps atmospheric air for secondary purposes of use on the fresh gas side. By contrast, FR 889 617 describes a membrane pump which is driven by pulses of the exhaust gases of combustion engines. The exhaust gas pulses act either directly on the membrane or indirectly via a piston which is guided in a cylinder and which is connected to the corresponding membrane via a plunger rod.

FR 866 840 in turn describes a gas-operated membrane pump which is likewise driven by pulses of the exhaust gases of combustion engines. The configuration comprises two membrane pumps which are connected in parallel and are driven via independent exhaust gas tracts of phase-offset engine cylinders but are interconnected on the fresh gas side both in the suction region and in the outflow region.

The actual linking of the membrane pumps into the exhaust gas tract of the combustion engine is not described in greater detail in these documents. A design with which the effectiveness, power output and/or efficiency of a combustion engine can be greatly increased by the use of a membrane pump as an exhaust gas charge pump in the exhaust gas tract of said combustion engine is known from applications EP 2 846 019 A1 and EP 2 846 020 A1, which were not previously published. The disclosure of these applications, in particular in relation to the configurations of the individual engine designs, the linking of the membrane pumps into these designs as exhaust gas charge pumps and the associated modes of operation, is hereby explicitly incorporated by reference.

In the design known from applications EP 2 846 019 A1 and EP 2 846 020 A1, which were not previously published, the membrane pump is driven by pulses or pressure fluctuations in a drive gas, in particular of the exhaust gas guided in the exhaust gas tract of the combustion engine, which gas is passed into the primary side of the membrane pump and the impulse of which gas is transmitted via the membrane to the delivery gas held in reserve in the secondary side of the membrane pump opposite the drive gas. In particular, the membrane pump should effectively convert briefly occurring gas pulses in the drive gas, such as occur for example in exhaust gas lines of combustion engines, into the compression of delivery gas, wherein the delivery gas in this application is preferably the fresh air to be sucked in by the engine for the combustion. In this design, the membrane pump thus works as an air compressor which can be used for charging or for increasing the efficiency of the combustion engine.

In this context, the membrane pump has an inlet to the working chamber of the drive side or primary side, through which the drive gas can flow in and out. The inlet is a branch line in which the drive gas pulses back and forth. On the secondary or delivery gas side, there is at least one inflow valve, through which the delivery gas can flow exclusively into the working chamber or the secondary side from the outside, and at least one outflow valve, through which the delivery gas can flow exclusively out of the working chamber. The inflow and outflow valves thus each operate as an independently controlling check valve. The membrane is held by inherent bias and/or by an external force, such as that of one or more springs, in a rest position corresponding to the maximum deflection of the membrane towards the drive side, in such a way that in this membrane position a maximum volume occurs on the delivery or secondary side and a minimum volume occurs on the drive or primary side.

If a pressure wave now flows through the inlet into the working chamber of the primary side of the membrane pump, it transfers its kinetic energy to the membrane by pulse transmission or pressure build-up of the drive gas in the working chamber. The membrane curves as a result of the energy input provided by the drive gas, and reduces the volume of the working chamber of the secondary side and thus of the delivery gas until the membrane is positioned on the inner contour of the pump housing. This is linked to a rise in pressure in the delivery gas on the secondary side of the membrane pump, in such a way that said gas is expelled from the membrane pump through the outflow valve. As the pressure of the drive gas decreases, the (spring) bias on the membrane pushes it back into the rest position thereof and thus sucks delivery gas through the inflow valve into the secondary side. At the same time, the drive gas is expelled again through the inlet through which it previously flowed into the working chamber of the primary side.

As a result of this design, the use of pressure pulses in the exhaust gas tract of the combustion engine for compressing and/or pre-compressing the fresh gas and thus for increasing the power or efficiency of the combustion engine is made possible in a particularly simple manner.

The object of the invention is now to provide a membrane pump of the above type by means of which the stated advantages, in particular in relation to use in the exhaust gas system of a combustion engine to increase effectiveness, can be even further increased. Further, a combustion engine can be provided having a particularly high specific power output and/or a particularly low specific fuel consumption.

For the membrane pump, this object is achieved according to the invention in that a leaf spring is provided as a restoring spring for applying the biasing force to the membrane.

The invention is based on the consideration that as a result of the membrane pump a particularly high increase in the efficiency and/or power output of the combustion engine can be achieved in that on the one hand the internal losses in the membrane pump are kept low as a result and on the other hand a particularly high agility and flexibility of the membrane system in reaction to the occurring pressure fluctuations is ensured. For this purpose, in particular the moving masses should be kept as low as possible. So as to achieve this using particularly simple means, the spring system provided for applying the biasing force to the membrane should be provided in so far as possible whilst omitting any guidance systems for the springs, and also in a design which makes it possible to use comparatively low-density materials for the actual spring. This is made possible by the use of a leaf spring as a type of spring for applying the bias.

The leaf spring provided for applying the biasing force to the membrane could be arranged in the sub-volume forming the secondary side of the pressure housing, and thus, as a compression spring, counter the deformation of the membrane resulting from an incoming exhaust gas pulse. Advantageously and for a particularly simple and thus particularly favourable construction, however, the leaf spring is arranged in the sub-volume forming the primary side. The leaf spring thus acts on the membrane, to which it is advantageously connected in a positive fit, as a tension spring. This arrangement suppresses higher-frequency natural vibrations within the spring, such as can occur for example in cylindrical compression spring systems if the excitation frequency is above the natural frequency of the spring system.

With a view to as gentle a mechanical stress as possible on the membrane, and thus a high endurance strength, the leaf spring is particularly advantageously configured for largely symmetrical introduction of force from the leaf spring into the membrane, the sum of the individual forces exerted on the membrane by the leaf spring preferably acting on the centre of area of the membrane. Within this meaning, the leaf spring is preferably connected to the membrane centrally, in such a way that the sum of the individual forces exerted on the membrane by the leaf spring acts on the centre of area of the membrane. For a cylindrical construction of the internal volume or a construction having a circular cross section in the region of the membrane, accompanying a circular construction of the membrane itself, the leaf spring is thus preferably connected to the membrane at the centre point thereof.

During operation of the membrane pump, and with a view to the expected pulse frequencies during operation of the combustion engine, micro-movements of the leaf spring at the free spring ends thereof are to be anticipated. So as to prevent stresses or damage thus brought about, the leaf spring is advantageously braced movably on the pressure housing. This bracing may expediently be provided by way of sliding elements and/or by way of pivotable or rotatable elements.

So as to make possible the particularly preferred construction having comparatively low moving masses, the leaf spring is expediently formed from a fibre composite material.

So as to achieve a largely uniform material load and thus an increased service life of the components as a whole, the leaf spring is formed widened in the central region, in which it is preferably also connected to the membrane, whilst tapering towards the outer edge regions. The leaf spring thus advantageously has a greater width in the central sub-region thereof than in the outer edge region thereof, preferably resulting in an approximately trapezium-shaped geometry in a plan view. As a result of this configuration, the finding that a parabolic outer contour would actually be particularly desirable for as uniform a load as possible on the leaf spring is taken into account using particularly simple means. This can be approximated in a simple manner by a trapezium-shaped contour.

In a particularly preferred embodiment which is considered independent in its own right, the leaf spring has a curved contour in the unloaded state. In this way, a particularly compact construction can be achieved. In this case, the curvature of the leaf spring is preferably towards the primary side. As a result, the leaf spring can sink into the primary-side housing cover approximately parallel to the membrane in the rest state, saving space. On the secondary side, a corresponding depression is preferably likewise provided in the fresh-gas-side or secondary-side pump cover, in which depression the curved leaf spring comes to be positioned when pressure (for example the exhaust gas pressure) is applied approximately to the deflected membrane.

A particularly advantageous construction, which is considered an inventive embodiment in its own right and can advantageously be used in combination with the above-described embodiment or else independently thereof, makes possible an increased membrane stroke, and thus a higher delivery volume of the membrane pump, for an unchanged material load. In this variant, which is inventive in its own right, the or each membrane is prefabricated with a curved shaping in such a way that in the pressure-free state the sub-volume forming the primary side has a minimum value in relation to the deformability of the or each membrane.

As a result of a plastic deformation of the membrane, preferably applied during manufacture or during operation, into a curved shape approximately corresponding to the curvature of the secondary-side housing cover, additional load relief of the membrane can be achieved. This artificial shaping of the membrane greatly reduces the tensile load at maximum deflection. A membrane curved in this manner would theoretically be subject to compressive stresses, which would cause the thin-walled membrane to form folds or kinks, in the central passage defined by the plane of the gripped membrane edge. However, as a result of the restoring spring forces acting in part on the membrane, locally non-uniform surface loads act between the delivery gas and the working gas, in such a way that the kink formation in the membrane does not occur and higher-order curvature patterns instead occur in the membrane. Thus, on the one hand the material stress during operation of the membrane is greatly reduced, whilst on the other hand greatly increased delivery volumes can be achieved.

Depending on the action point of the restoring forces, these curvature patterns may comprise a radial wave formation or a rosette-shaped structure. The risk of folding or kinking of an (individual) membrane is advantageously countered by thin-walled membranes positioned on top of one another in multiple layers. The thin-walled membranes, which are now of a comparatively low thickness, have a higher reverse bending resistance, but achieve similar tensile strength to the original individual membrane for the same total thickness over the total number thereof. The thin-walled membranes are pressed together during operation by the gas pressures acting on both sides.

The membrane is advantageously configured as a planar circular plate, but may also be of an elliptical shape. Advantageously, metals or plastics materials (thermoplastics, thermosets, elastomers etc.), which may have fibre reinforcements (glass fibres, carbon fibres etc.), are provided as materials. So as to reduce the mechanical load on the membrane under tension and bending, in a particularly advantageous embodiment the membrane edge is gripped movably (and not rigidly) in the pressure housing of the membrane pump. The movable gripping may advantageously take place with resiliently raised radial curvatures, for example by way of O-rings protruding out of the housing covers or else simply as a result of the membrane edge being gripped in the housing via an intermediate layer of resilient materials.

Advantageously, an end stop for the membrane delimiting the sub-volume forming the primary side is arranged in the sub-volume forming the primary side of the membrane pump. Said end stop advantageously has a spring-mounted support surface for the membrane, in such a way that the pump for the membrane can be operated in a manner particularly gentle on the material. In this context, the end stop defines the position of maximum extension of the membrane into the sub-volume forming the primary side of the pump, and thus the point of the membrane protruding furthest into the sub-volume forming the primary side within the above meaning. The end stop of the membrane can be brought about indirectly by means of the leaf spring in that the leaf spring comes into contact with the housing cover when relaxed towards the rest position. This contact advantageously takes place in the form of rolling up starting from the spring ends.

In a further particularly preferred construction of the membrane pump, which is also considered inventive in its own right and which can be used in combination with one or both of the above variants or else independently thereof, the inner face of the sub-volume of the pressure housing forming the primary face has a continuously widening cross section in a diffuser region extending from an inflow face towards the membrane, the point of the membrane protruding furthest into the sub-volume forming the primary face being spaced apart from the inflow face by at least 5 mm in the pressure-free state.

As a result of a construction of this type, the pulse transmission from the drive gas flowing into the primary side of the pump, in other words from the gas carrying the pressure pulse from the exhaust gas tract of the combustion engine, to the membrane, and thus the compression effect on the secondary or fresh gas side is configured to be particularly effective. In particular, in this context reflection phenomena of the incoming pressure wave and the like are largely prevented. To make this possible, in this preferred variant the flow guidance for the drive gas entering the primary side of the pump is selected in such a way that turbulence formation is prevented in so far as possible and the drive gas can arrive at the membrane as perpendicularly as possible. This can be achieved in that the arrival region in the primary side of the pump, in other words the chamber region in front of the actual membrane, is configured in the manner of a diffuser having a cross section continuously widening towards the membrane. In this context, the "free" sub-volume which forms the primary side in the pressure-free state, in other words the volume between the membrane in the pressure-free state and the inner face of the housing cover delimiting the primary side, should be selected sufficiently large that the desired diffuser effect of the pressure wave flowing into the primary side can be sufficiently ensured. With a view to conventional installation sizes or those which are to be expected during use in practice, the distance between the zone of maximum deflection of the membrane into the primary volume and the housing wall should be selected to be sufficiently large for this purpose.

In this context, a construction which particularly simple and thus particularly expedient for manufacture can be achieved in that the desired diffuser effect is provided in advance by a suitable configuration of the inner surface of the primary side of the membrane pump. For this purpose, the diffuser region is advantageously configured as an outer surface of a frustum. This has substantially straight flanks and can have an elliptical or preferably also a circular cross section. Advantageously, the cone angle of the frustum is between 10° and 30°, since by way of a selection of this type a particularly favourable effectiveness can be achieved.

A further configuration goal considered particularly favourable for the shaping of the primary side of the membrane pump, as an alternative or in addition to the desired arrival of the pressure wave at the membrane as perpendicularly as possible in the primary side of the pump, is for the pressure wave to arrive at the membrane over as large an area as possible. In other words, for particularly effective pulse transmission, the pressure wave should in so far as possible not just be limited to a comparatively small area of the membrane, but rather arrive there over as much of the area as possible.

So as particularly to promote this, the drive-gas-side opening, in other words in particular the inflow face, into the sub-volume of the membrane pump forming the primary side advantageously has a free-flow cross-sectional area of at most approximately 70% of the area of the membrane delimiting the sub-volume forming the primary side. Thus, an increase in cross section within the housing region configured as a diffuser is achieved, and makes it possible to expect particularly favourable guidance of the incoming pressure pulse, specifically with a view to the pressure and flow relationships to be expected in relation to use in the exhaust gas tract of the combustion engine.

Advantageously, further geometrical parameters of the region of the primary side of the pump configured as a diffuser region are also selected in accordance with these criteria. For example, for reasons of space or costs, a "lateral" or tangential inflow of the drive gas into the primary side of the membrane pump could be provided. Advantageously, however, the inflow is configured centrally and axially, since in this way the pulse transmission of the incoming pressure wave to the membrane can be particularly comprehensive. For this purpose, the central axis of the diffuser region is preferably orientated parallel to the central axis of the membrane and/or preferably positioned concentric therewith. In this context, "central axis of the membrane" means the normal to the surface of the membrane through the centre point or centre of area thereof in the relaxed or non-deformed state.

Alternatively or in addition, the geometric parameters are particularly preferably selected in such a way that the diffuser region of the internal volume of the membrane pump provided as the primary side has a length, as seen in the direction of the central axis of said pump, of at least one-and-a-half times the membrane stroke. Thus, the volume within the diffuser region is sufficiently much greater than the delivery volume of the membrane pump that the desired diffuser effect is particularly reliably achieved.

In relation to the combustion engine, the stated object is achieved in that a membrane pump of one of the above embodiments or a combination of these embodiments is connected into the exhaust gas system of said engine in such a way that the combustion chamber of the or each cylinder is in each case connected to a gas inlet system, via an actuable inlet valve system on the inlet side, and both to an exhaust system and via a branch line to the primary side of the membrane pump connected into the gas inlet system on the secondary side, via an actuable outlet valve system via a pulse switch on the outlet side.

In an advantageous embodiment, in this context the linking of the membrane pump into the exhaust gas system is configured in such a way that a pressure wave passed from the pulse switch via the primary side of the membrane pump to the membrane passes through a diffuser.

In this context, the desired diffuser effect can be achieved in that the membrane pump is configured in accordance with the above design, in other words by way of the geometrical configuration of the inner face of the sub-volume forming the primary side as a diffuser. Alternatively or in addition, however, it may also be provided that the desired diffuser effect is achieved by way of a corresponding configuration of the branch line leading to the primary side of the membrane pump. In this variant, which is considered inventive in its own right, the branch line connecting the membrane pump to the pulse switch on the primary side has, in the opening region thereof into the membrane pump, a free cross-sectional area which is increased by at least one-and-a-half times by comparison with the connection point thereof to the pulse switch. In this variant of the invention, the widening of the cross section provided to constitute the diffuser function is thus already implemented at least in part in the supply line, connected upstream from the membrane pump on the primary side, for the drive gas, in other words the pressure wave from the exhaust gas tract.

In a particularly preferred embodiment which is also considered inventive in its own right, on the basis of this variant, in other words of integrating the diffuser into the branch line proceeding from the pulse switch, a hybrid construction may also be provided in which elements of a plurality of membrane pumps are combined into an overall system. In particular, in this context a plurality of secondary volumes, separated from one another on the gas side, are advantageously assigned to a shared primary volume in a shared housing cover. Thus, a plurality of membrane pumps can be arranged in parallel on the gas side in a particularly simple manner so as to achieve a larger pump volume. In this context, arrangements in which the chambers having like function are combined are advantageous. In particular, in this context a shared housing cover for two or more pump units is preferably provided. A double chamber of this type on the working gas side makes it possible for the drive gas advantageously to flow onto the centre of the membranes laterally. In this case too, a diffuser-like pipe progression is preferably provided, which widens in line cross section towards the membrane pump and in doing so takes on an approximately rectangular cross section progression and leads to the desired pressure progression.

In a particularly advantageous embodiment, the combustion engine is configured for hot gases such as the exhaust gas from the combustion chambers not to act directly on the membrane pump even in operation, but instead for the membrane pump to be thermally decoupled from the exhaust gas tract through which the exhaust gas actually flows. This advantageously deliberately exploits the fact that, when the primary side of the membrane pump is acted on by the pressure wave which drives it, merely a displacement flow is present, in which the gas cushion located in the branch line and if applicable in the primary chamber is merely driven further into this by the incoming pressure wave before the gas is pushed back into the branch line again after the pulse transmission is complete. This can be exploited for thermal decoupling within the stated meaning in that said gas cushion is dimensioned sufficiently large by suitably selecting the geometrical parameters, in particular the volume within the branch line and if applicable also the "empty" volume in the primary chamber of the membrane pump. Within this meaning, "sufficiently" implies in particular that the volume of this gas cushion is greater than the maximum volume of gas which can be located in the primary side of the membrane pump. A configuration of this type ensures that the exhaust gas flowing out of the combustion chamber of the cylinder in question cannot enter the primary chamber of the membrane pump after passing the pulse switch. For this purpose, the gas cushion volume, formed by the sub-volume forming the primary side of the membrane pump and by the inner volume of the branch line, is advantageously at least 1.5 times, preferably at least 3 times, the pump volume of the membrane pump.

Suitably selecting the geometrical parameters also makes it possible, among other things, to form the membrane pump in whole or in parts from materials which are not thermally resistant or at least cannot be subjected to high thermal stresses, for example on the basis of plastics material.

The advantages achieved by the invention are in particular due to the fact that, as a result of the use of a leaf spring as a biasing spring for the membrane, reliable biasing of the membrane can be achieved using particularly simple means and in a lightweight construction having low moving masses. In addition, it is thus possible to keep the installation space for the spring system particularly small, in particular the axial length of the biased spring. Thus, a particularly compact construction is possible whilst maintaining a particularly high effectiveness of the combustion engine.

An embodiment of the invention is described in greater detail with reference to drawings, in which.

Like parts are provided with like reference numerals throughout the drawings.

Figure 1:
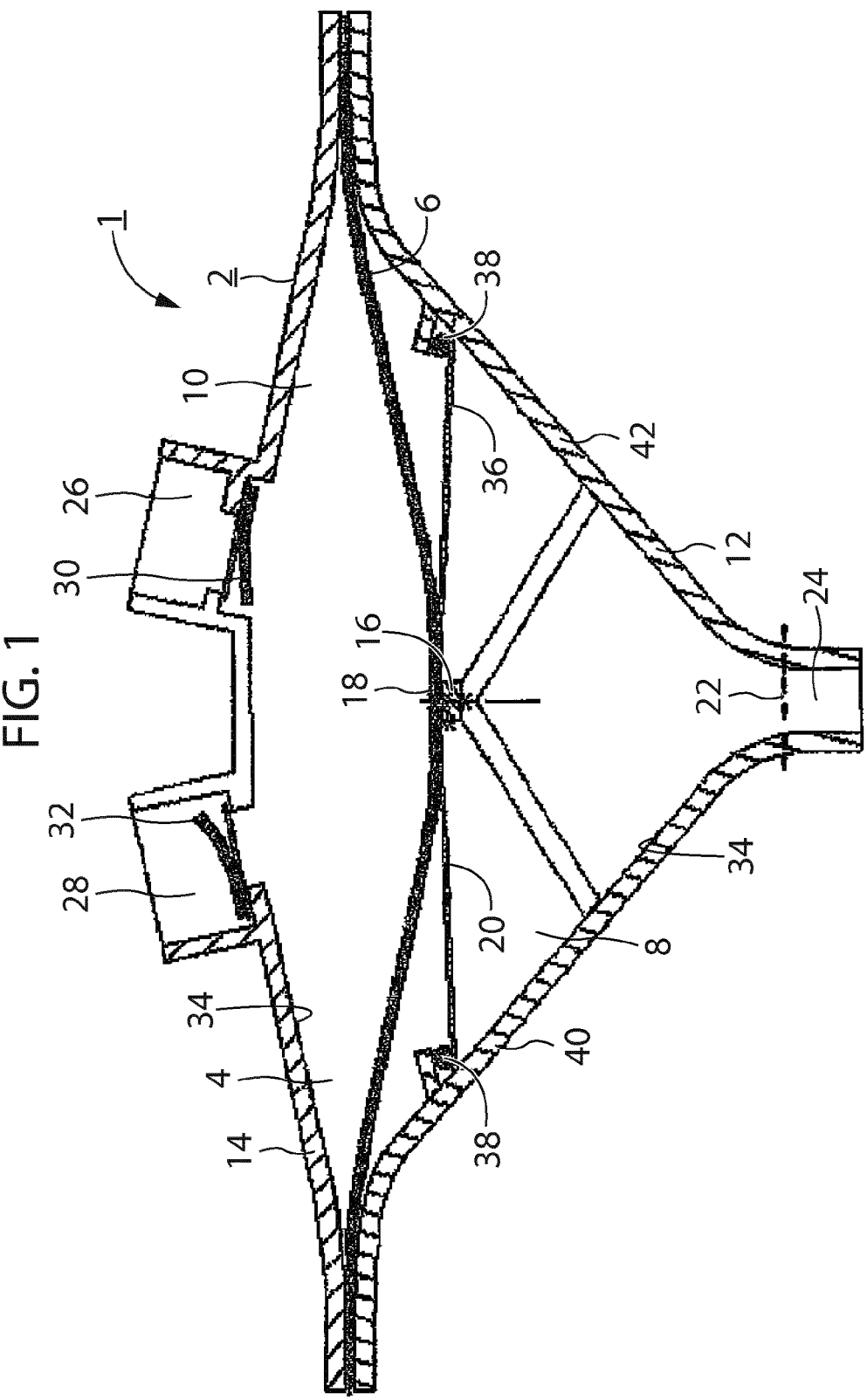
FIG. 1 is a cross section of a membrane pump.

The membrane pump 1 comprises a pressure housing 2, the internal volume 4 of which is subdivided by a resiliently deformable membrane 6 into a pluralit y—two in the embodiment shown—of sub-volumes 8, 10 separated from one another on the gas side.

The membrane 6 is thus located between a primary-gas-side housing cover 12 (primary side) and a fresh-gas-side housing cover 14 (secondary side), which together form the pressure housing 2, as a resiliently deformable intermediate wall. It separates the sub-volume 8 forming the primary side and the sub-volume 10 forming the secondary side, which span out between the membrane 6 and the curved inner surfaces of the two housing covers 12 and 14, from one another in a gas-tight manner. The first sub-volume 8 thus forms the primary side and thus the primary volume of the membrane pump 1 within the meaning that the drive gas is introduced into this volume and thus drives the pump. By contrast, the second sub-volume 10 is the gas chamber for the fresh gas to which the enthalpy is to be transmitted and which is to be compressed, and thus forms the secondary side of the pump.

A biasing force is mechanically applied to the membrane 6 in such a way that in the pressure-free state the sub-volume 8 forming the primary side has a minimum value in relation to the deformability of the membrane 6. In this state, which corresponds to FIG. 1, the centre point of the membrane 6 is thus positioned on a stop 16 positioned within the sub-volume 8. So as to keep the mechanical loads on the membrane 6 comparatively low during operation, the stop 16 is configured resilient or springy at least on the face thereof facing the membrane 6. The membrane 6 is further provided with a metal contact disc 18 in the central region thereof in which it is positioned against the stop 16 in the pressure-free state shown.

To provide the aforementioned biasing force, in the embodiment of FIG. 1 a spring 20 arranged in the sub-volume 8 forming the primary side is provided. In the pressure-free state, said spring deflects the membrane 6 from the tension-free central position thereof towards the stop 16, in such a way that the membrane 6 is positioned against said stop. In this context, the biasing force of the spring 20 is selected to be greater than the restoring force of the maximally deflected membrane 6, in such a way that the membrane 6 is reliably positioned against the stop 16 fully deflected in the state without application of gas pressure.

At least one inlet and outlet duct 24, through which the drive gas or the gas column used for pulse transmission can flow into and out of the primary-side sub-volume 8 forming the primary gas volume of the membrane pump 1, is arranged in the primary-gas-side housing cover 12 as a gas-side opening into the inflow face 22 indicated by the dashed line. By contrast, at least one fresh gas suction duct 26 and at least one fresh gas pressure duct 28 lead to the second sub-volume 10 forming the secondary side of the membrane pump 1 and thus through the housing cover 14 delimiting said sub-volume. Said ducts are respectively equipped with check valves (flap valves) 30, 32, in such a way that a gas can flow exclusively into the sub-volume 10 of the secondary side of the membrane pump 1 in the fresh gas suction duct 26 and exclusively out of the sub-volume 10 of the secondary side in the fresh gas pressure duct 28. For the purpose of a high compression ratio on the secondary side, the check valves 30, 32 are preferably attached as close as possible to the inner surface 34 of the housing cover 14, so as to keep the remaining residual volume (dead space) between the membrane 6 and the check valves 30, 32 as small as possible when the membrane 6 is deflected onto the inner surface 34.

In the rest state, the membrane 6 is maximally deflected to the primary side as a result of the bias, and the sub-volume 8 of the primary side is at a minimum. In this state, the point of the membrane 6 projecting furthest into the sub-volume 8 forming the primary side is thus defined by the contact plate 18 positioned against the stop 16. By contrast, on the secondary side, the corresponding sub-volume 10 is maximally filled with fresh gas. If drive gas under pressure (or the gas cushion) now acts on the primary side via the inlet and outlet duct 24, the membrane 6 moves towards the secondary side and urges the fresh gas stored in the sub-volume 10 of the secondary side through the check valve 32 into the downstream fresh gas pressure duct 28 under compression until the membrane 6 is positioned on the inner surface 34. If the gas pressure on the primary side is subsequently relieved (for example by flooding back into the drive gas tract), the membrane 6 is pressed back against the stop 16 by the spring 20 and the initially present membrane restoring force. The gas on the primary side is thus expelled in part and the increasing sub-volume 10 on the secondary side is simultaneously filled with fresh gas via the fresh gas suction duct 26. The energy stored in the compressed spring 20 is thus used for load alternation (expelling exhaust gas and sucking in fresh gas) in the membrane pump 1.

The membrane pump 1 is deliberately configured for a particularly high effectiveness in the conversion of the pulse or pressure pulse carried by the drive gas flowing into the first sub-volume 8 through the inlet and outlet duct 24 into a movement of the membrane 6 and thus into compression of the fresh gas held in reserve in the second sub-volume 10, along with a particularly high service life of the components. In this context, it is in particular also taken into account that as a fundamental principle the moving masses of the membrane 6 and the spring 20 are to be kept as low as possible. To make this possible, in particular the spring system is configured suitably by configuring the spring 20 as a leaf spring 36.

A leaf spring 36 of this type is a spring system which can be manufactured from relatively low-density materials. Further, a spring system of this type makes it possible to keep the installation space for the spring system small, in particular the axial length of the biased spring(s). A spring system of this type, which incidentally also does not require linear guidance and can thus be manufactured in a particularly simple manner, is in general the leaf spring or all derivatives which can be developed from this type of spring, including the lamella springs consisting of a plurality of leaf spring tongues, such as are made use of for example as spring systems in vehicle couplings.

Advantageously, spring materials consisting of light fibre composite material are provided in a spring system of this type. These materials only have approximately one quarter the density of steel.

The leaf spring 36 may be arranged on the delivery gas or secondary side, and thus in the sub-volume 10 of the membrane pump 1. However, the embodiment of FIG. 1 shows the preferred alternative embodiment of the membrane pump 1 in which the restoring force on the membrane 6 is generated by way of a leaf spring 36 arranged in the sub-volume 8 on the working gas or primary side, and thus as shown in the form of a bar spring in FIG. 1. In this context, the leaf spring 36, configured as a tension spring in the embodiment of FIG. 1, is connected centrally to the membrane 6, in such a way that the sum of the individual forces exerted on the membrane 6 by the leaf spring 36 acts on the centre of area of the membrane 6. The associated free end 38 of the leaf spring 36 is mounted or braced on the housing cover 12. In the particularly advantageous embodiment shown, it is braced on contact faces which have a curved path, in such a way that the free spring ends can roll on these curved paths during a rocking movement.

Alternatively, the leaf spring 36 could also be rigidly connected to one of the housing covers 12, 14, in such a way that the free springing ends act on the membrane 6. The symmetrical introduction of force from the leaf spring 36 to the membrane 6 is advantageous, it being intended for the sum of the individual forces to act on the centre of area of the membrane 6. In the region of the introduction of the spring force, the membrane 6 is advantageously reinforced by support discs so as to reduce kinking stresses or high contact pressures.

The leaf spring 36 may consist of a plurality of individual springs on top of one another or else be configured with a plurality of arms and with a corresponding number of free spring ends.

Because of the micro-movements which occur at the free ends of the leaf springs 36 during movement, the spring ends 38 are advantageously braced indirectly against the support thereof via sliding elements made for example of plastics material or connected to the support via pivotable or rotatable elements. In a preferred embodiment, the leaf spring 36 consists of a composite material having good tribological properties, in such a way that a central sliding element for supporting the spring ends can be omitted. For example, the leaf spring 36 may consist of composite material comprising polyamide binder and the support on the pump housing may consist of high-grade steel. Because of the low thickness thereof, the leaf spring 36 can be integrated into the pressure housing 2 virtually neutrally in terms of installation space.

Figure 2:
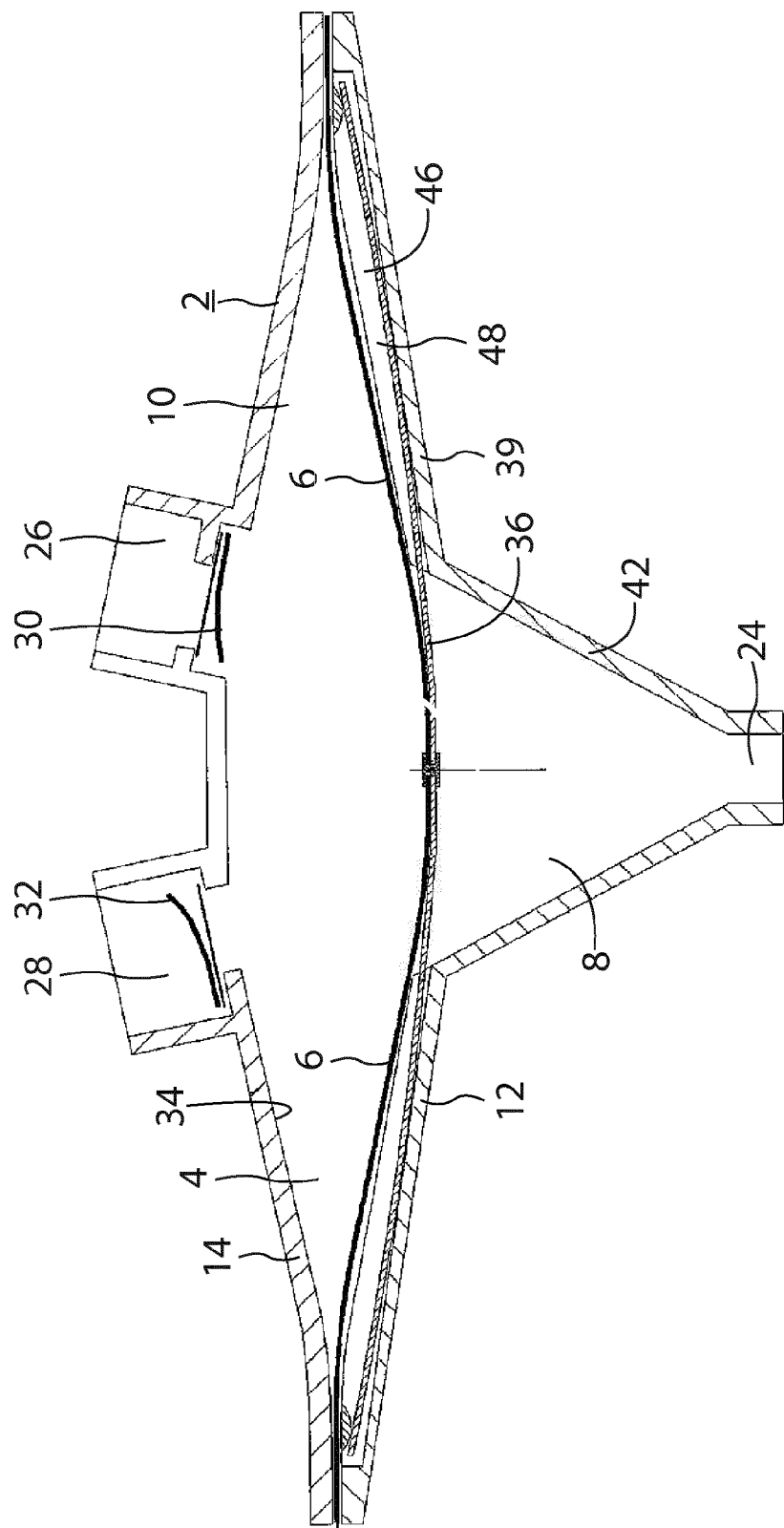
FIG. 2 is a cross section of an alternative embodiment of a membrane pump.

In a particularly preferred embodiment which is considered inventive in its own right, as shown in the embodiment of FIG. 2, the leaf spring 36, optionally in addition to the membrane 6, is shaped in advance and configured to be curved. In this case, the end stop for the membrane 6 is provided indirectly by the leaf spring 36 in that the leaf spring 36 comes into contact with the housing cover 12 when relaxed in the rest position. So as to make the process of attachment to the housing cover 12 particularly gentle on the materials, the shaping is preferably selected in such a way that this contact takes place in the form of rolling up starting from the spring ends. A stop in the form of a separate component is thus extraneous.

In addition, the primary-side housing cover 12 is provided with a depression 46, of which the end edge 48 is visible in FIG. 2 as a result of the sectional drawing, on the inner face 39 thereof for receiving the leaf spring 36. The depression 46 in the housing cover 12 for receiving the spring 36 is geometrically configured in such a way that the spring can carry out the aforementioned rolling-up process when coming into contact.

In both of the above-described variants, when the membrane 6 is maximally deflected into the first, primary-side sub-volume 8, the spring force or characteristic of the spring 20, 36 should have a minimum excess of force corresponding to the force countering the pulses of the working gas via the membrane surface by way of the minimum gas pressure. The maximum restoring force of the spring 20, 36 when the membrane is fully deflected into the delivery gas chamber or the secondary-side sub-volume 10 is determined by a plurality of factors, such as the pulse frequency of the working gas, the moving masses, the delivery volume of the pump and the counter pressure of the delivery gas when expelled from the pump. The spring forces and the progression thereof over the spring stroke, in other words the characteristic, should therefore be individually tuned to the application of the pump.

Figure 3:
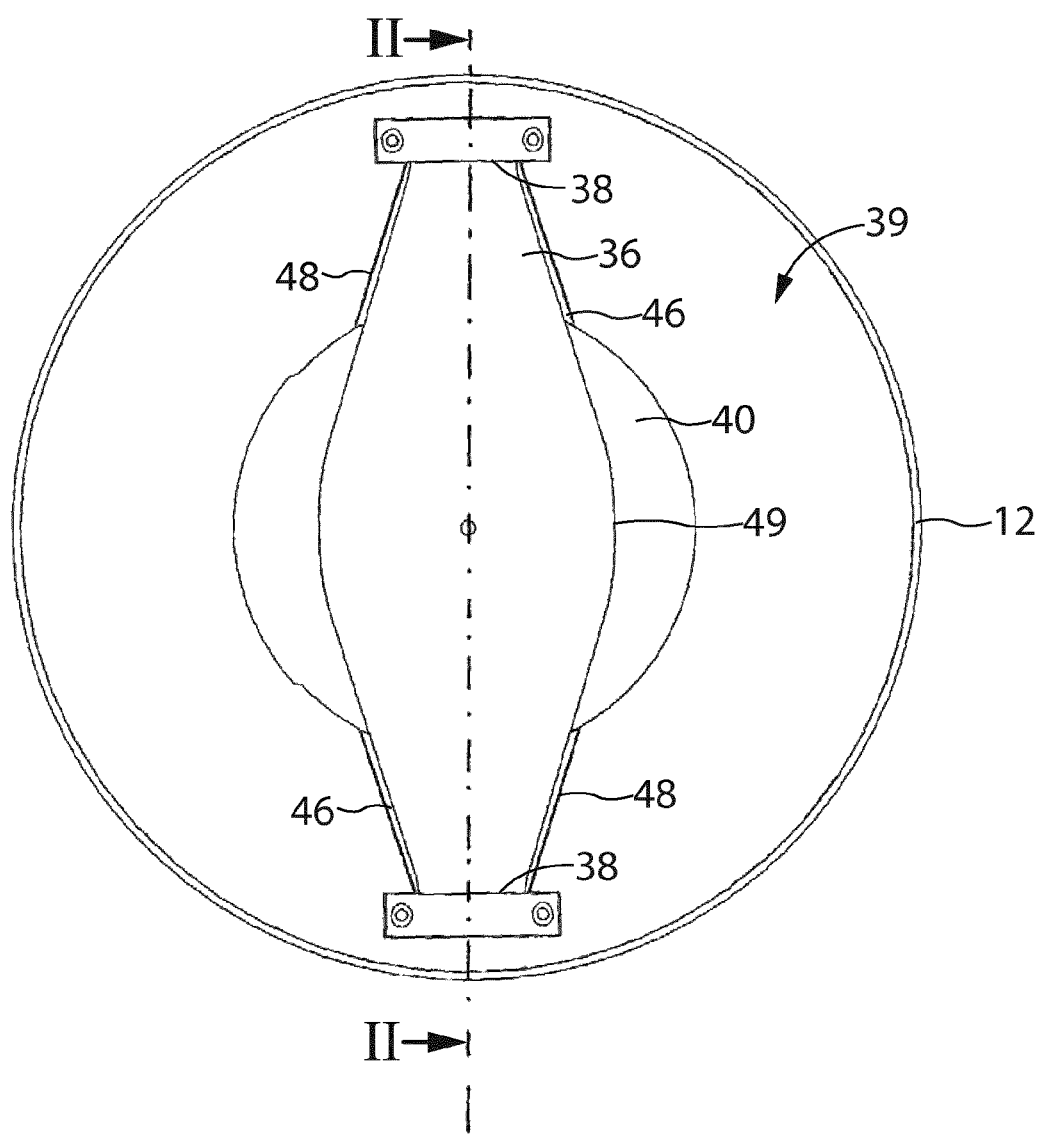
FIG. 3 is a plan view of the inner face of the primary-side housing cover of the membrane pump of FIG. 2.

So as to achieve a largely uniform material load and thus an increased service life of the components as a whole, the leaf spring 36 is additionally formed widened in the central sub-region 49 thereof, in which it is also connected to the membrane 6, whilst tapering towards the outer edge regions and towards the free ends 38. The leaf spring 36 thus has a greater width in the central sub-region 49 thereof than in the outer edge region thereof, preferably resulting in a trapezium-shaped geometry in a plan view. This can also be seen in the plan view of the inner face 39 of the primary-side housing cover 12 in FIG. 3, in which the depression 46 can also be seen.

In an embodiment which is considered inventive in its own right and can be used together with or else independently of the above-described embodiment, the membrane pump 1 shown in the embodiment of FIG. 1 is also additionally configured to convert the kinetic energy of the gas pulse of an incoming pressure wave into a membrane movement particularly efficiently. For this purpose, it is provided for the gas flow to be passed to the entire or to the majority of the membrane area in so far as possible. In this context, turbulence formation should be largely prevented in such a way that the pulse of the gas molecules can arrive at the membrane 6 predominantly perpendicularly. For these reasons, the membrane pump 1 according to the embodiment is configured in terms of construction so as to pass the incoming pressure wave through a diffuser element before it arrives at the membrane 6.

In the embodiment of FIG. 1, this is achieved by suitably shaping the inner face 39 or inner surface of the sub-volume 8 forming the primary side. The inner face 39 is formed in such a way that in a sub-portion configured as a diffuser region 40 it forms the diffuser with a cross section constantly widening towards the membrane 6. In this context, so as to provide an upstream volume which is particularly suitably dimensioned for the desired diffuser effect and in which the incoming pressure wave can propagate sufficiently well before contact with the membrane 6, a distance of approximately 25 to 30 mm from the inflow face 22 is provided for positioning the stop 16 in the embodiment. This implements the configuration criterion whereby in the pressure-free state a minimum distance of at least 5 mm from the inflow face 22 should be maintained for the point of the membrane 6 projecting furthest into the sub-volume 8 forming the primary face, in other words the contact plate 18 in contact with the stop 16.

So as to implement the diffuser-like configuration of the housing cover 12 in a particularly simple manner, in the embodiment of FIG. 1 the inner face 39 of the primary-side housing cover is configured as the outer surface of a frustum 42 in the diffuser region 40.

In this context, in the embodiment of FIG. 1, as a result of the construction the primary-gas-side housing cover 12 is configured in the diffuser region 40 in the manner of a frustum 42 in its entirety, in other words both on the inner face and on the outer face. Alternatively, to achieve the desired diffuser effect it is of course also possible merely to configure the inner face 39 of the housing cover 12 in the stated manner and to configure the outer face thereof with a different geometry, for example cylindrical, which is suitable for the relevant purpose of use.

In the embodiment, the gas-side inlet 22 and thus the inlet and outlet duct 24 into the sub-volume 8 forming the primary face have a free-flow cross-sectional area of approximately 2 to 5% and thus of at most 70% of the area of the membrane 6 delimiting the sub-volume 8 forming the primary face. Preferably, and for a particularly high effectiveness, the cone angle of the frustum 42 is between 10° and 30°.

On the drive or primary side, in the embodiment of FIG. 1, for a centric spring arrangement, the housing cover 12 specifically has a funnel-shaped contour in the region 40 configured as a diffuser, a rigidly gripped membrane edge requiring a funnel edge extending parallel to the membrane and the movably gripped membrane being able to preserve a falling funnel edge. The funnel contour itself can extend towards the centre in a straight line or else slightly concave in cross section.

In terms of geometry and shaping, for both above-described variants in accordance with FIGS. 1 and 2, the pressure housing 2 of the membrane pump 1 substantially consists of the two housing covers 12, 14, the joining plane of which is the plane of the membrane 6 or a plane parallel thereto. The inner contour of the secondary-side housing cover 14 definitively determines the deformation of the membrane 6 in the deflected state thereof and thus the mechanical load thereon. On the secondary or delivery gas side, in other words in the housing cover 14, the inner contour thereof is expediently configured in such a way that the membrane 6 comes into contact with, in other words unrolls onto, the inner surface 34 from the membrane edge to the centre under the pressure of the drive gas, and the maximum admissible tensile and bending stresses of the membrane material are not exceeded. Thus, for the membrane 6 gripped rigidly at the edge, a housing cover contour is preferably provided which basically corresponds in cross section to a lying-down double S, and for the movably gripped membrane edge, a housing cover contour is preferably provided which corresponds to a dome.

The housing covers 12, 14 may in principle be manufactured cost-effectively in the form of plastics material injection-moulded parts, sheet metal pressings or die-cast parts.

Figure 4:
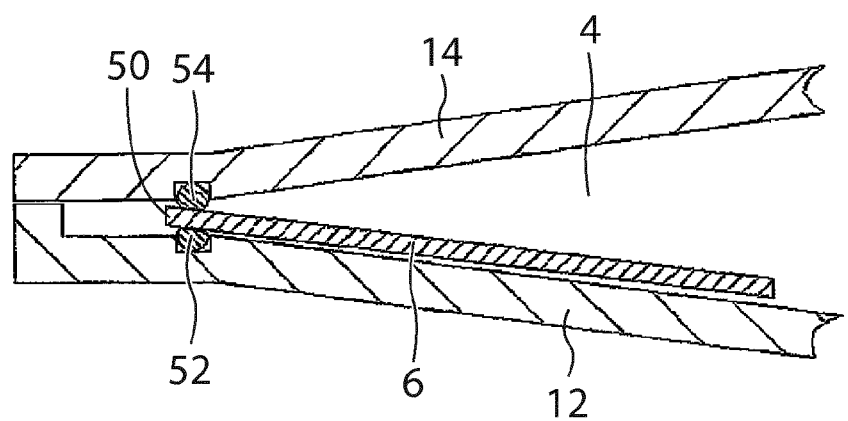
FIG. 4 is an enlarged detail from FIG. 1, FIGS. 5 and 6 are each a cross section of an alternative embodiment of a membrane pump, FIG. 7-11 each schematically show a combustion engine.

The membrane 6 is configured as a planar circular plate in the embodiment, but may also be of an elliptical shape. In particular metals or plastics materials (thermoplastics, thermosets, elastomers etc.), which may have fibre reinforcements (glass fibres, carbon fibres etc.), are provided as materials. So as to reduce the mechanical load on the membrane 6 under tension and bending and thus during operation of the membrane pump 1, as can be seen from the enlarged detail of FIG. 4 the membrane edge 50 is movably gripped between the housing covers 12, 14. In this context, the movable gripping is achieved by means of resilient raised radial curvatures. In the embodiment, O-rings 52, 54 which respectively project out of the housing covers 12, 14 are provided for this purpose. Alternatively, it would in principle also be possible to grip the membrane edge 50 in the pressure housing 2 by way of an intermediate layer or resilient materials.

Further load relief for the membrane 6 can be brought about by way of plastic deformation of the membrane 6, during manufacture or during operation, into a curved shape approximately corresponding to the curvature of the housing cover 14. Artificial shaping of this type of the membrane 6 greatly reduces the tensile load at maximum deflection. In particular, as a result of the curved shaping the membrane 6 no longer has an inherent bias, which would direct it into the central position in the pressure-free state. Instead, the curvature of the membrane 6 approximates to the curved inner contour of the pump housing, in such a way that at maximum deflection no tensile loads, or tensile loads lower than would be the case for a planar membrane contour, occur in the membrane 6. A membrane 6 curved in this manner would theoretically be subject to compressive strains, which would cause the thin-walled membrane 6 to form folds or kinks, in the central passage defined by the plane of the gripped membrane edge 50. On the other hand, however, as a result of the restoring spring forces acting on the membrane 6 in part or locally, locally non-uniform surface loads act between the delivery gas and the working gas, in such a way that kink formation in the membrane 6 appears not to occur and higher-order curvature patterns instead occur in the membrane 6. Depending on the point where the restoring forces act, these curvature patterns may comprise a radial wave formation or a rosette-shaped structure.

The risk of fold formation or kinking in an (individual) membrane 6 can be countered in the manner of a preferred embodiment by thin-walled membranes positioned on top of one another in multiple layers. The thin-walled membranes, which are now each individually of a comparatively low thickness, have a higher reverse bending resistance, but achieve similar tensile strength to an individual membrane for the same total thickness over the total number thereof. The thin-walled membranes are pressed together during operation by the gas pressures acting on both sides.

Figure 5:
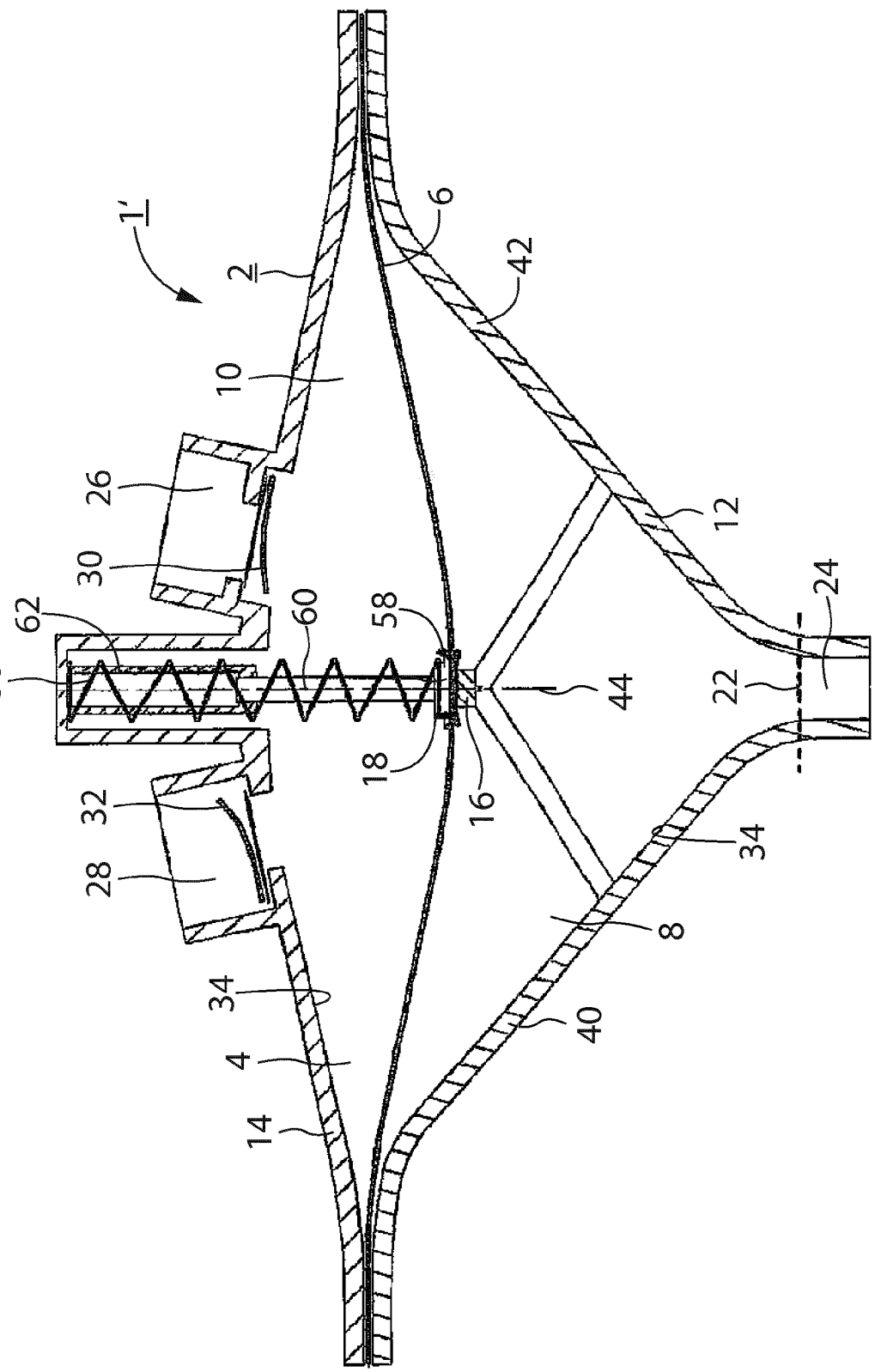

The diffuser-like configuration of the primary volume can, as described above, be provided in combination with the configuration of the spring system as a leaf spring 36. By contrast, the embodiment of FIG. 5 shows a variant in which the diffuser-like configuration of the housing is combined with a more conventionally configured spring system. This comprises a spring 56, which is braced both on the primary-gas-side housing cover 12 and by way of a spring seat 58 rigidly connected to the membrane 6.

Figure 6:
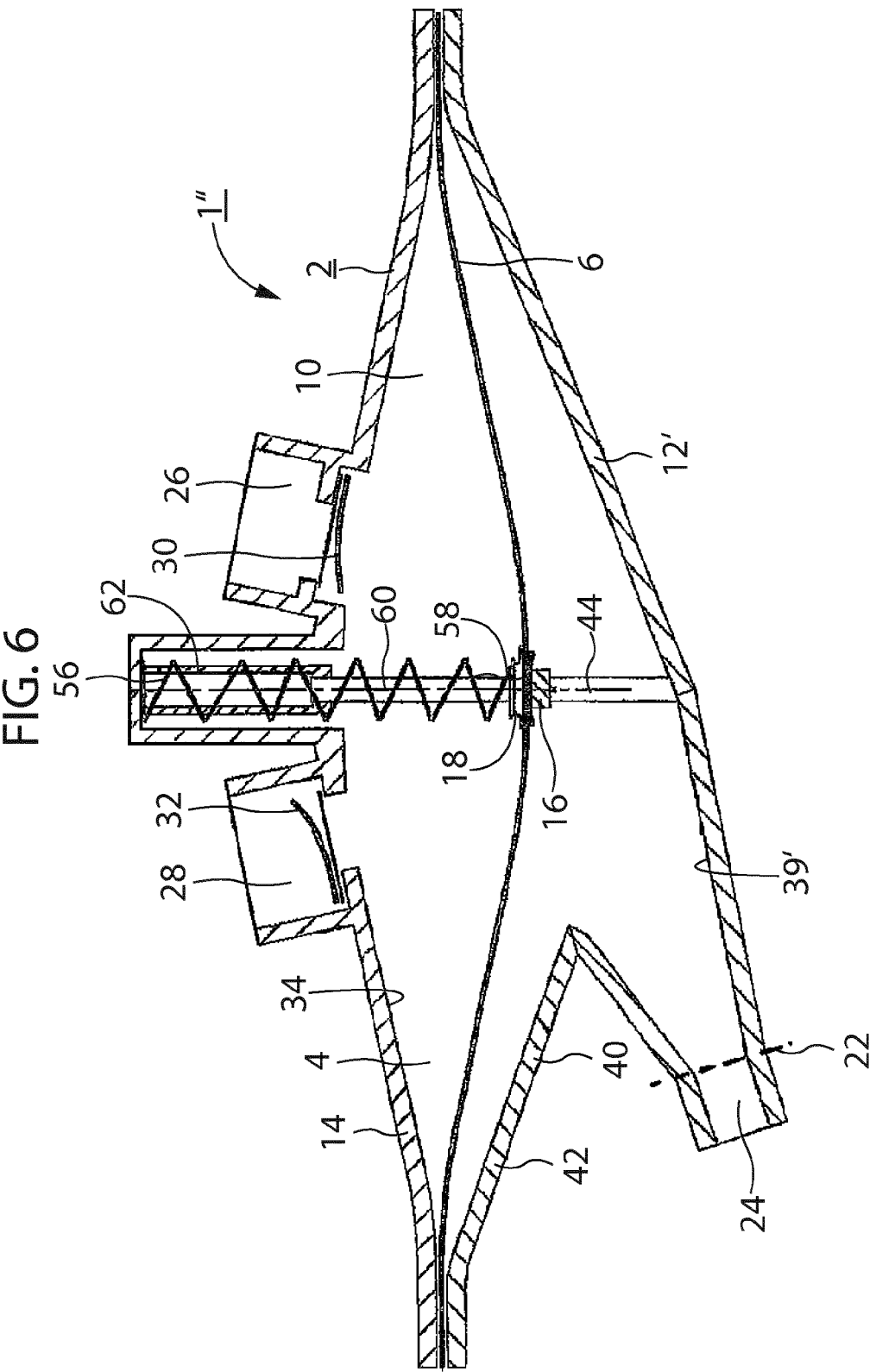

It is considered particularly advantageous for the incoming pressure wave or incoming drive gas to flow onto the membrane 6 centrally. For this purpose, as is shown in the embodiments of FIGS. 1 and 5, the central axis 44 of the diffuser region 40 is orientated parallel to the central axis of the membrane 6 and positioned concentric therewith. In this context, "central axis of the membrane 6" means the normal to the surface of the membrane 6 through the centre point or centre of area thereof in the relaxed or non-deformed state. By contrast, if the perpendicular flow onto the membrane 6 is not possible, for example for reasons of space or as a result of the construction, a tangential diffuser-like inflow may also be provided. An embodiment of a construction of this type is shown in FIG. 6. This arrangement in the membrane pump 1" does not allow exclusively symmetrical flow onto the membrane 6, but still uses the majority of the available membrane area to transmit a pulse thereto. In both embodiments, for a particularly favourable diffuser effect the diffuser region 40 preferably has a length, in the direction of the central axis 44 thereof, of at least one-and-a-half times the membrane stroke.

Both in the embodiment of FIG. 5 and in the embodiment of FIG. 6, the restoring force is exerted on the membrane 6 by the spring 56, which is arranged on the working gas side or secondary side in the sub-volume 10 and configured as a compression spring. The centric arrangement provided in this context of the spring 56 is advantageous since nominally no lateral forces act as a result of bending of the membrane 6. So as to ensure exclusively axial movement of the spring 56, the spring 56 is provided with a linear or axial guide. In the embodiment, said guide is provided by a guide pin 60, which is connected to and positioned perpendicular to the membrane 6 and which is in turn guided in a rigidly positioned sliding bearing 62. Alternatively, one or more tensile springs may also be provided on the primary side of the membrane 6, in other words in the sub-volume 8. However, eye-shaped restraints of the spring ends have poor durability properties because of the kinking thereof. In this application, the spring ends should, similarly to with compression springs, be configured by way of spring seats which in each case include the first winding of the tensile spring. A tensile spring of this type would be advantageous over the compression spring in terms of the lack of risk of kinking, in such a way that a linear guide of the membrane 6 would not be required.

Pneumatic suspension of the membrane 6 would also be possible. This has advantages in terms of the low spring mass and the resulting possibility of omitting a linear guide. This pneumatic spring could advantageously consist of a hermetically sealed gas volume in a deformable container which is compressed by the membrane 6. A container of this type could for example be configured in the form of a bellows or merely of a ball.

Figure 7:
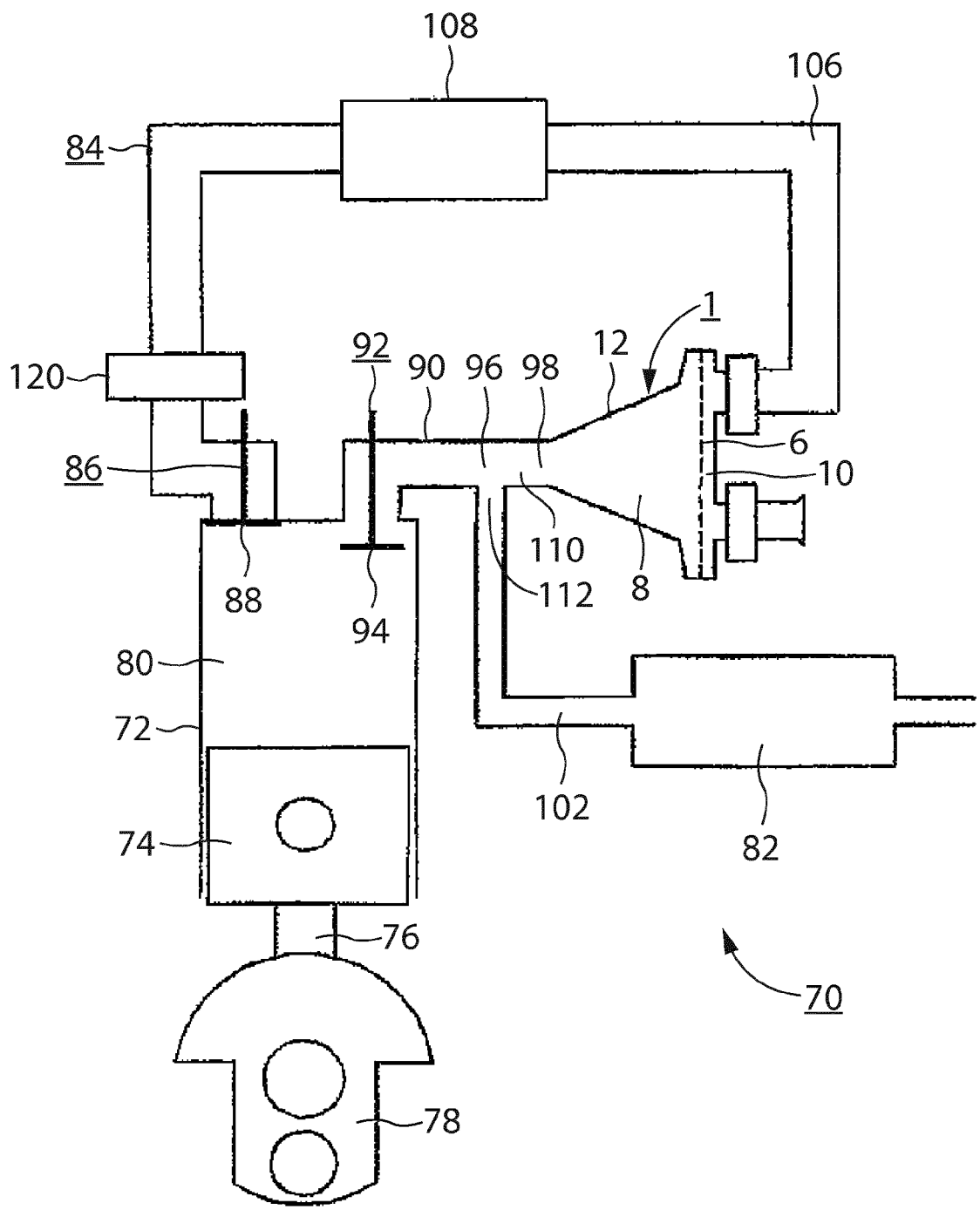

Particularly advantageously and in an embodiment considered inventive in its own right, the membrane pump 1, 1', 1" configured in accordance with the above descriptions is used in the manner of an exhaust gas charge pump in the exhaust gas tract of a combustion engine. In this context, the advantages of introducing the drive gas into the primary chamber of the membrane pump via a diffuser can be exploited so as particularly to increase the effectiveness. A combustion engine of this type can thus be configured with a particularly high specific power output and/or a particularly low specific fuel consumption. As an embodiment for this purpose, FIG. 7 schematically shows a combustion engine 70 configured for the 4-cycle method. It comprises a number of cylinders 72, only one of which is shown in FIG. 7 and in each of which a working piston 74 is guided. The working piston 74 acts on a crankshaft 78 via a piston rod 76. Depending on the configuration and construction of the combustion engine 70, the working piston or pistons 74 of a plurality or all of the cylinders 72 may also act on a shared crankshaft 78.

In a conventional construction, the combustion chamber 80, in which a compressed fuel-air mixture is ignited in the working cycle of the cylinder 72, is located within the cylinder 72. In reaction to this, the working piston 74 arranged displaceably in the cylinder 72 performs a working stroke, driving the crankshaft 78 to provide power. After the working stroke is complete, in other words after the expansion of the combusted working gas in the cylinder 72 and shortly before bottom dead centre (BDC) is reached, the combusted working gas is supplied to an exhaust system 82, connected to the cylinder 72 on the outlet side, as exhaust gas during an outlet cycle of said cylinder.

For the gas exchange required for operating the cylinder 72, the combustion chamber 80 is connected on the gas inlet side to a gas inlet system 84 and on the outlet side to the exhaust system 82. To control the gas exchange in the combustion chamber 80, on the one hand the combustion chamber 80 can be blocked off from the gas inlet system 84 by means of an inlet valve system 86, which is configured as an inlet valve 88 in the embodiment of FIG. 7. On the other hand, the combustion chamber 80 can be blocked off from the exhaust gas tract 90 leading to the exhaust system 82 by means of an outlet valve system 92, which is configured as an outlet valve 94 in the embodiment of FIG. 7.

The combustion engine 70 is selectively configured for a particularly high specific power yield and/or a particularly high efficiency and thus low specific fuel consumption. For this purpose, it is provided that at least part of the exhaust gas enthalpy, which is otherwise not actually exploited, is drawn from the hot exhaust gas flowing out of the combustion chamber 80 during the outlet cycle of the cylinder 72 in question, so as to convert it into mechanical drive energy and/or an increase in the fresh gas air density for supercharging, so as to increase the efficiency. This is to be achieved in that a pulse and/or energy is drawn as extensively as possible from the exhaust gas pressure wave flowing out of the combustion chamber 80 during the outlet cycle and transmitted to the fresh gas flowing to the combustion chamber 80 for pressurisation.

To make this possible, the exhaust gas tract 90 is made branched. For this purpose, a pulse switch 96 is connected into the exhaust gas tract 90, and is connected on the inlet side to the outlet valve system 92 and on the outlet side both to the primary side of the membrane pump 1 configured in accordance with the above embodiments via a branch line 98 and to an exhaust gas line 102 leading to the exhaust system 82. The combustion chamber 80 is thus connected both to the exhaust system 82 and to the primary side of the membrane pump 1 on the outlet side via the outlet valve system 92 and via the pulse switch 96.

As a result of this setup, in the embodiment of FIG. 7 the enthalpy drawn from the exhaust gas in the membrane pump 1 is exploited for compression and thus pressurisation of a cold gas flow supplied to the membrane pump 1 on the secondary side, specifically in this embodiment to the fresh gas airflow provided for supply to the combustion chamber 80. Accordingly, in the embodiment of FIG. 7, the membrane pump 1 is connected on the secondary side to a fresh gas line 106, which passes through a charge air cooler 108 and on the outlet side is connected to the combustion chamber 80 of the cylinder 72 in a blockable manner via the inlet valve system 86.

In the embodiment of FIG. 7, the cylinder 72 of the combustion engine 70 is shown at the moment when the working piston 74 is located at bottom dead centre (BDC) and the outlet cycle of the cylinder 72 is beginning. The outlet valve 94 has begun to open. When the outlet valve 94 opens, the exhaust gas which is still under residual pressure escapes from the combustion chamber 80 of the cylinder 72 into the outlet duct or exhaust gas tract 90. Since the residual pressure of the exhaust gas in the cylinder 72 is generally between 2 and 8 bar, and there are average exhaust gas counter pressures of approximately 1.1-1.6 bar in the outlet duct, the exhaust gas flows past the outlet valve 94 at the speed of sound as a result of the supercritical pressure ratio. Because of the high exhaust gas temperatures, which are between 350 and 1150° C. in practice, the speed of sound for the exhaust gas reaches values of up to 1000 m/s. The pulse ($p=m \cdot v$) of the exhaust gas pressure wave, which is to be exploited in a targeted manner to increase efficiency and/or power in the present system, is correspondingly high.

Depending on the engine speed and the configuration of the engine valve drive, the transit time of the high-energy primary exhaust gas pressure wave is approximately 10-50 crankshaft degrees. The exhaust gas pressure wave flows through the pulse switch 96, which advantageously forms a pipe branching point. The pulse switch 96 has a primary duct 110, which is connected on the inlet side to the outlet valve system 92 and on the outlet side to the primary side of the membrane pump 1, and from which an exhaust gas duct 112 branches off, which opens on the outlet side into the exhaust gas line 102 and is connected via this to the exhaust system 82. The primary duct 110 thus opens into the branch line 98 leading to the membrane pump 1, whilst the exhaust gas duct 112 leads to the exhaust system 82 via which exhaust gas reaches the open air.

The pulse switch 96 has the purpose of guiding the pulse of the exhaust gas flow into the branch line 98 as completely as possible when the outlet valve 94 is opened, in such a way that in a first cycle phase of the outlet cycle the pulse of the exhaust gas pressure wave flowing out of the cylinder 72 is transmitted as completely as possible or at least in part to the primary side of the membrane pump 1. In this phase, a flow of exhaust gas out into the exhaust gas duct 112, resulting in a loss of pulse, should be largely prevented. The desired pulse transmission from the exhaust gas pressure wave to the primary side of the membrane pump 1 may be provided in that the exhaust gas arrives directly in the membrane pump 1 at least in part; however, indirect pulse transmission is particularly preferred, in which the exhaust gas pressure wave flowing out of the cylinder 72 transmits the pulse thereof in part or as completely as possible to the gas column already located in the branch line 98, which in turn transmits it into the membrane pump 1.

In the membrane pump 1, the (directly or indirectly introduced) pulse of the exhaust gas flow arrives at the membrane 6, and deforms it by pulse transmission. The moving mass of the resilient membrane 6 is preferably comparable to the mass of the accelerated exhaust gas column, so as to transmit as much kinetic energy m ($\frac{1}{2} m_{wall} \cdot v_{wall}^2$) as possible to the resilient membrane 6 during the pulse transmission ($m_{gas} \cdot v_{gas} = m_{wall} \cdot v_{wall}$). The gas present in the primary side of the membrane pump 1 thus expands in the increasing primary gas volume or sub-volume 8 of the membrane pump 1. At the same time, on the opposite side of the membrane 6, fresh gas is compressed in the decreasing secondary or fresh gas volume or sub-volume 10, connected to the fresh gas line 106, in the membrane pump 1. Thus, in the membrane pump 1, enthalpy of the exhaust gas converted into expansion work on the primary side is converted into compression energy of the fresh gas guided in the fresh gas line 106 on the secondary side.

The extremely low mass of the membrane 6 makes possible a very rapid change of volume in the membrane pump 1 and accordingly a rapid decompression of the exhaust gas within a few crankshaft degrees, in such a way that the first cycle phase of the outlet cycle, provided for converting the enthalpy of the exhaust gas, converted into expansion work on the primary side, into compression energy of the fresh gas guided on the secondary side in the fresh gas line 106, can be kept correspondingly short.

Subsequently, this is followed by the second cycle phase of the outlet cycle, in which the exhaust gas flows to the exhaust system 82. After the deformation of the membrane 6, it is moved back into the initial position thereof by a restoring force, and displaces the exhaust gas or the gas column located in the branch line 98 back to the pulse switch 96 via the branch line 98. From there, in the second cycle phase of the outlet cycle, the exhaust gas arrives in the exhaust gas duct 102 whilst bypassing the membrane pump 1, in other words without flowing through it. Likewise, the piston 74 displaces the exhaust gas still present in the cylinder 72 from said cylinder into the exhaust gas duct 112 via the exhaust gas tract 90 and the pulse switch 96. By contrast, during the compression the fresh gas is pushed out of the membrane pump 1, by a check valve provided therein, into the fresh gas line 106 provided and configured as a pressure storage line, where it remains until the inlet valve 88 and an optionally provided additional valve 120 are opened. The fresh gas line 106 may thus be considered as a buffer, to which the fresh gas compressed in the membrane pump 1 is supplied and in which it is reserved for supplying to the combustion chamber 80 of the cylinder 72.

The membrane pump 1, 1', 1" is particularly suitable for use in the manner of an exhaust gas charge pump for charging single-cylinder and two-cylinder combustion engines, such as are used for example in two-wheelers, ATVs, snowmobiles, leisure devices, aircraft engines and stationary engines, but also for multi-cylinder engines in the automobile sector, for example so as to assist existing turbochargers. In the following, further preferred designs are described, each considered independently inventive in its own right, for linking an exhaust gas charge pump of this type into the exhaust gas system of a combustion engine.

Charge Stratification:

The use of a membrane pump 1, 1', 1" of the above-described type as an exhaust gas charge pump results in further options for charge stratification in the cylinder 72 of a combustion engine 70', by way of which in particular even easily ignitable fuels such as hydrogen can be used in a controlled manner.

Figure 8:
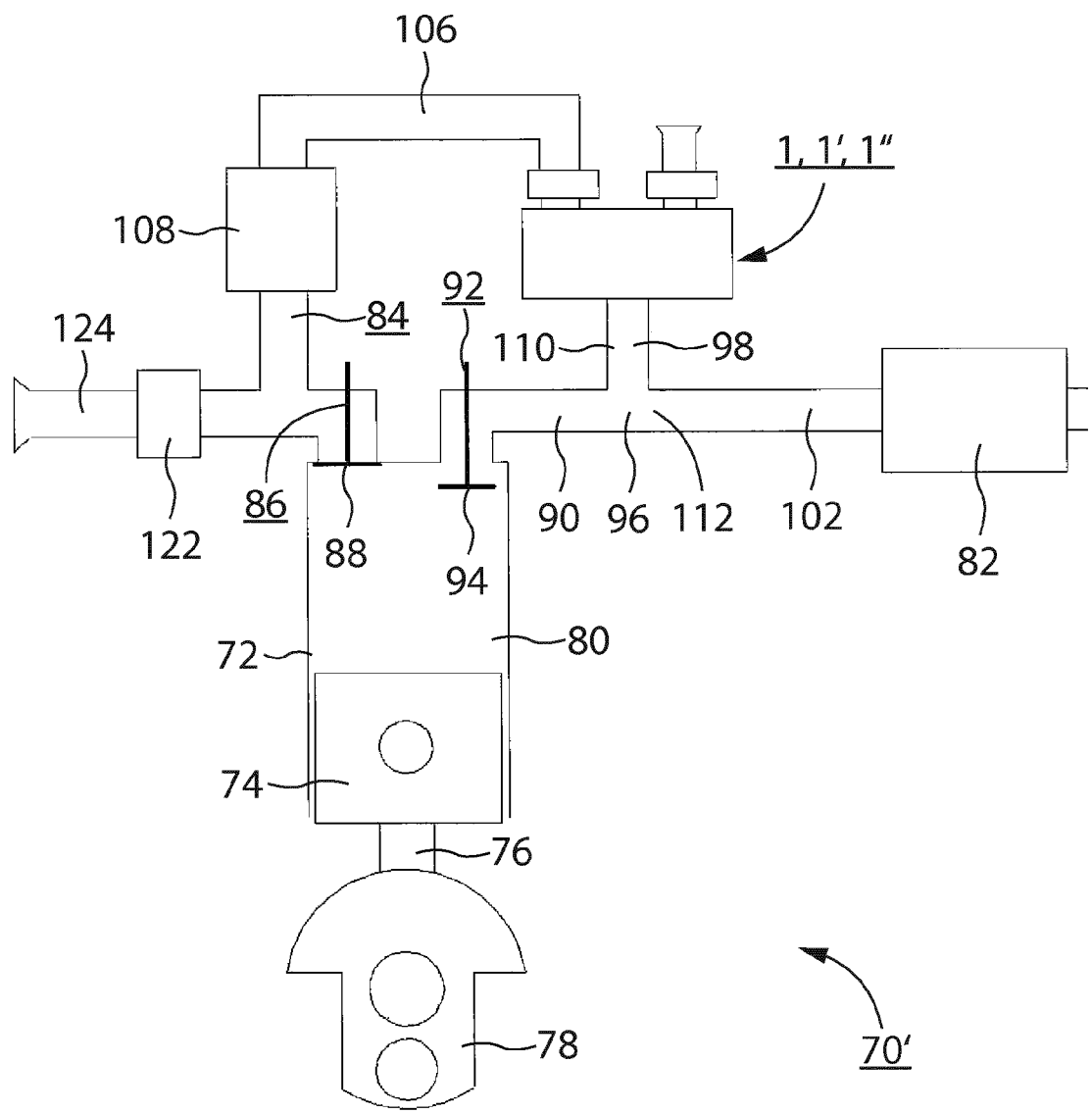

FIG. 8 shows a combustion engine 70' of this type configured for the use of hydrogen as a fuel. This is considered inventive in its own right.

In the flushing phase, the combustion engine 70' shown in FIG. 8 is configured to be supplied both with pre-compressed air from the membrane pump 1, 1', 1" in accordance with the above-described working principle and with air from the surrounding atmosphere. For this purpose, an additional fresh air line 124, provided with a check valve 122, opens into the fresh gas line 106 at a point downstream from the charge air cooler 108. In this case, the cylinder 72 is flushed in two temporally separate phases. At the start of the inlet flushing or overlap phase of the inlet and outlet valves, exclusively pre-compressed air from the fresh gas line 106 serving as a storage line is used for flushing the cylinder 72. Only when the pressure in the fresh gas line 106 serving as a storage line has reached atmospheric level does the combustion engine 70' start sucking in air from the environment via the check valve 122 in the second flushing phase. The first flushing phase is used for flushing out residual gas and for cooling the combustion chamber surfaces in the engine. In the second flushing phase, fuel can be mixed into the atmospheric air. This flushing method makes it possible to prevent fuel flushing losses into the outlet system and to suppress direct contact of fuel-air mixture with hot exhaust gas. A flushing method of this type, which is considered inventive in its own right, is thus advantageous in particular for easily ignitable fuels such as hydrogen gas, so as to reduce the risk of auto-ignition by cooling the combustion chamber and holding air in reserve.

Figure 9:
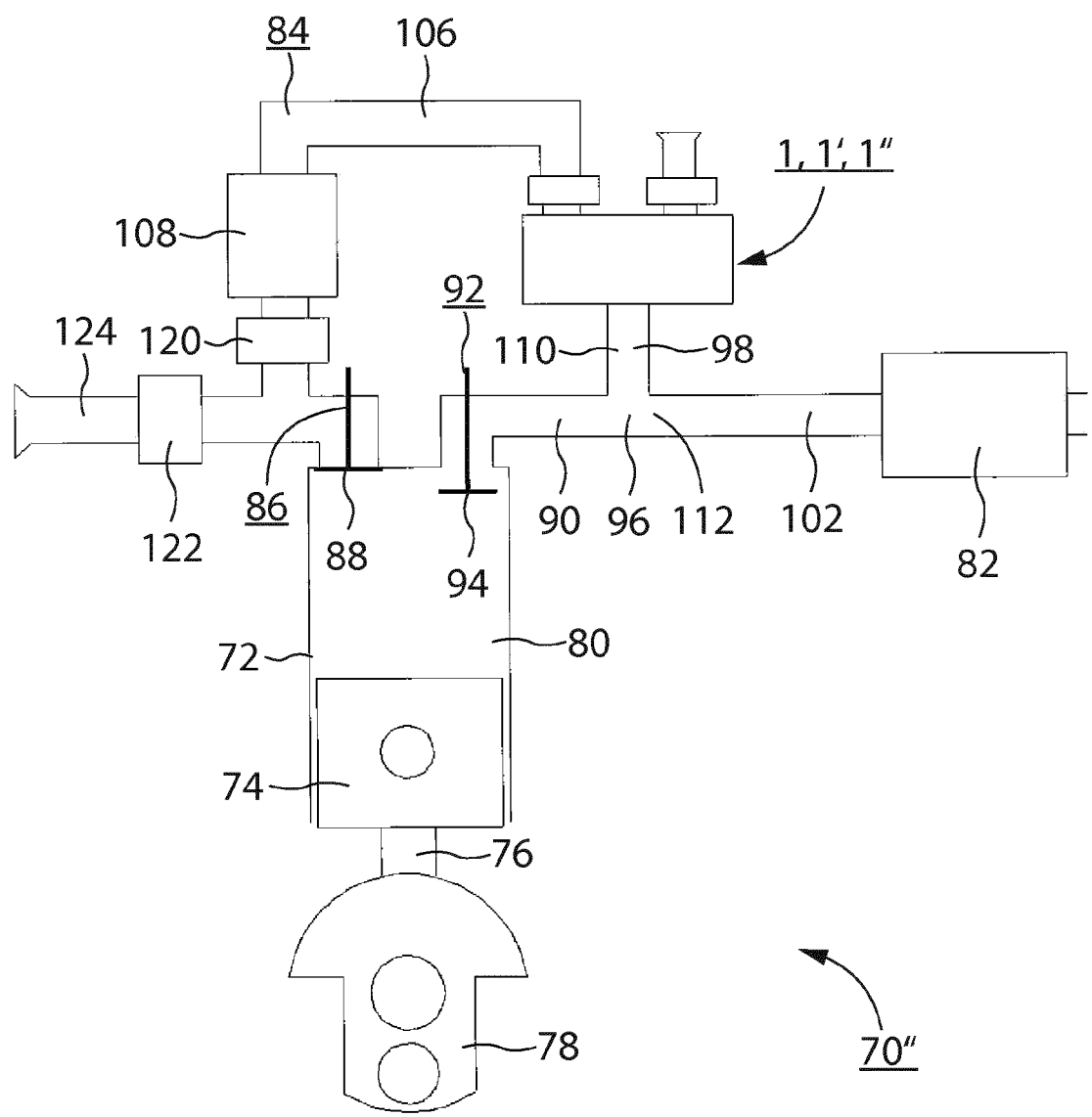

Recharging:

The combustion engine 70" shown in FIG. 9, which is likewise considered inventive in its own right, is deliberately configured to achieve particularly high charging levels. In this variant, the fresh air line 124 provided with the check valve 122 is provided in the fresh gas line 120 in addition to and in combination with the additional valve 120.

During operation of this combustion engine 70", in a first flushing phase the fresh gas line 106 serving as a pressure storage line is blocked by the additional valve 120. The engine thus sucks in air from the atmosphere exclusively via the fresh air line 124 in this flushing phase, until the descending piston 74 has approximately reached the bottom dead centre region. The additional valve 120 now opens the fresh gas line 106 for the second flushing phase, in such a way that the air pre-compressed by the membrane pump 1, 1', 1" and held in reserve in said line flows into the engine cylinder via the suction duct and leads to the desired charging. In this context, the check valve 122 in the fresh air line 124 prevents the pre-compressed air from flowing out into the atmosphere. In this embodiment, the high charging levels are achieved in that the combustion engine 70" obtains the major part of the cylinder filling thereof by free suction, and the entirety of the air pre-compressed by the membrane pump 1, 1', 1" used as an exhaust gas charge pump is used exclusively for recharging. The air pressure remaining in the fresh gas line 106 forming the suction duct when the inlet valve and additional valve are closed promotes the residual gas being flushed out efficiently in the subsequent working cycle.

Figure 10:
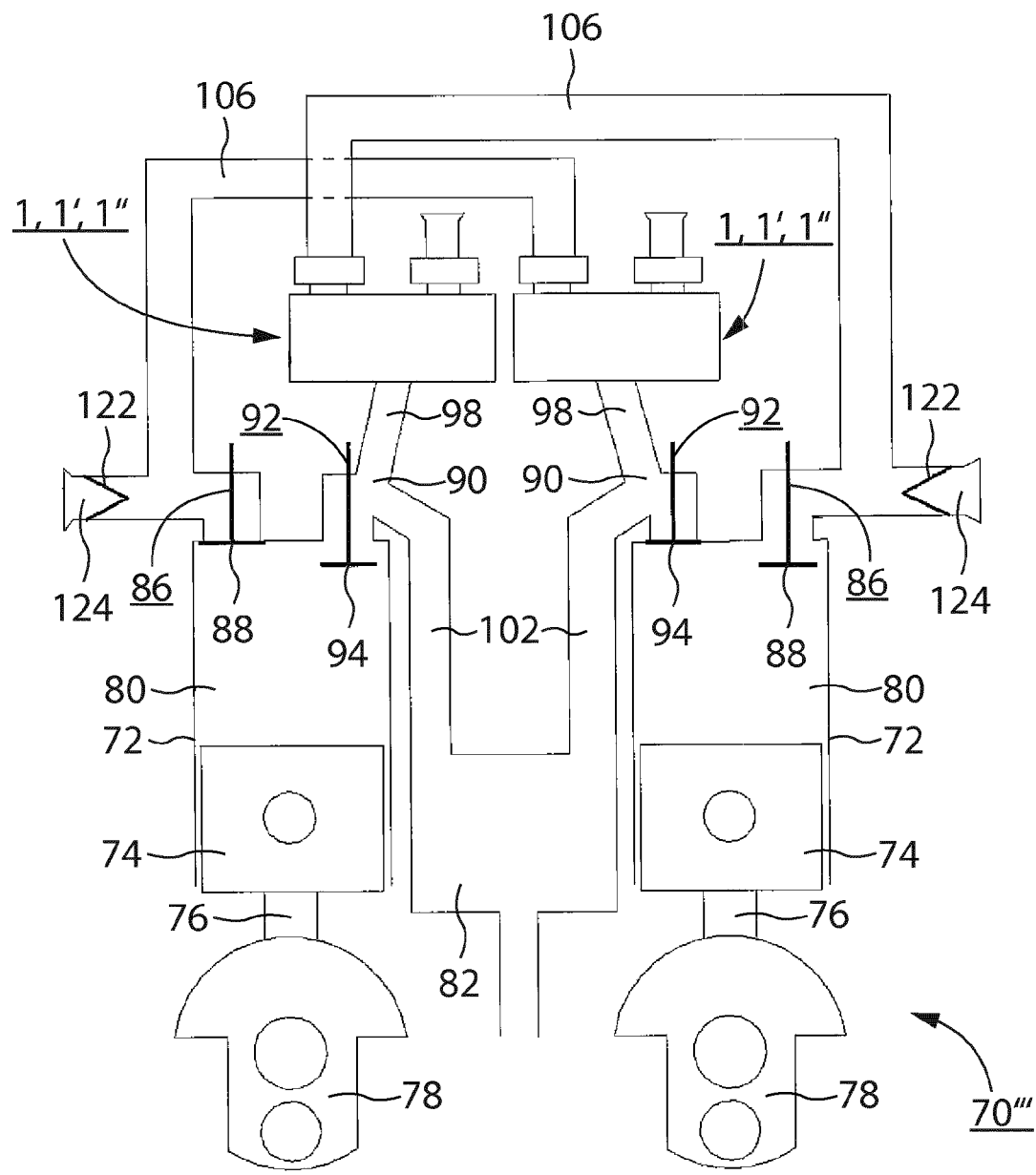
Figure 11:
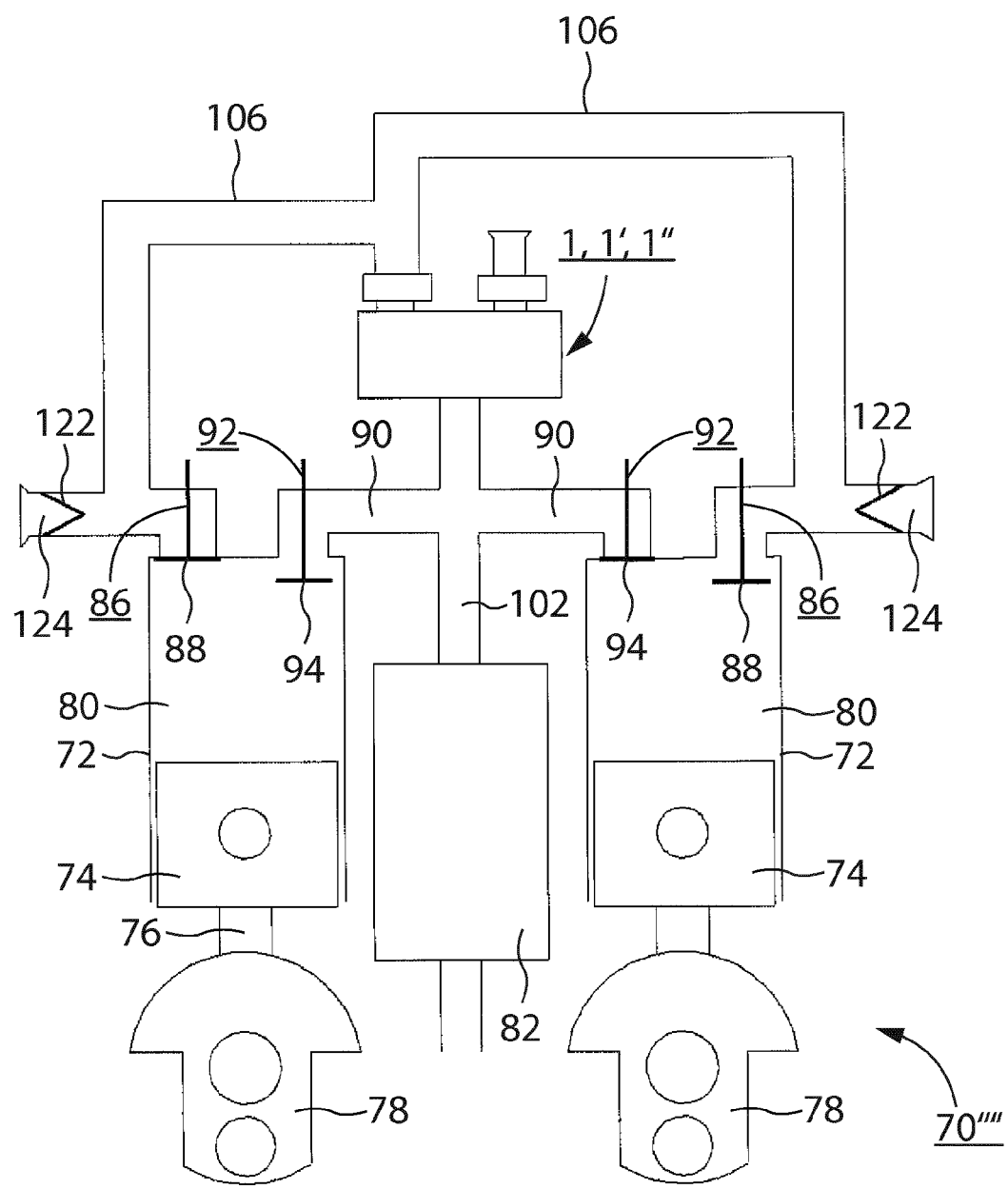

Charging Using Two Cylinders Having a 360 Degree Ignition Spacing:

For two cylinders 72 having a 360 degree ignition spacing which operate in the four-cycle method, advantageously one of the configurations according to FIG. 10 or FIG. 11, which are each also considered inventive in their own right, is provided, by means of which recharging can be achieved in a particularly simple and efficient manner. As a result of the 360 degree ignition spacing of the two engine cylinders 72, the exhaust gas pulse of a cylinder 72, which pulse drives the membrane pump 1, 1', 1", arrives substantially simultaneously with the favourable point in time for the fresh gas recharging of the other cylinder 72. This situation makes it possible to get by without phase-controlling additional valves and to make use of the exhaust gas pulse of a cylinder 72 for recharging the corresponding second cylinder 72 with fresh gas. The two engine cylinders 72 initially carry out an introduction of air with free suction, as described above.

The above-described method according to the invention is particularly suitable for all engine constructions having even numbers of cylinders, in which every two cylinders 72 are offset in working cycle by 360 degrees, and which are in each case equipped with a membrane pump 1, 1', 1" connected as an exhaust gas charge pump 1, 1', 1" for every cylinder 72 (FIG. 10) or for every two cylinders 72 (FIG. 11). For the four-cylinder in-line engine having a planar crankshaft, for example, preferably the cylinders 1 and 4 and the cylinders 2 and 3 are combined for the described charging method.

So as to make possible a particularly high increase in the effectiveness of the combustion engine 70, 70', 70", 70''', 70'''' by means of the use of the exhaust gas enthalpy, in a preferred embodiment the membrane pump 1 according to the above description is configured for particularly efficient pulse transmission from the exhaust gas pressure wave to the membrane 6 and thus conversion into compression energy of the fresh gas. For this purpose, introduction of the exhaust gas wave into the primary volume of the membrane pump 1 via the diffuser is particularly favourable.

Figure 12:
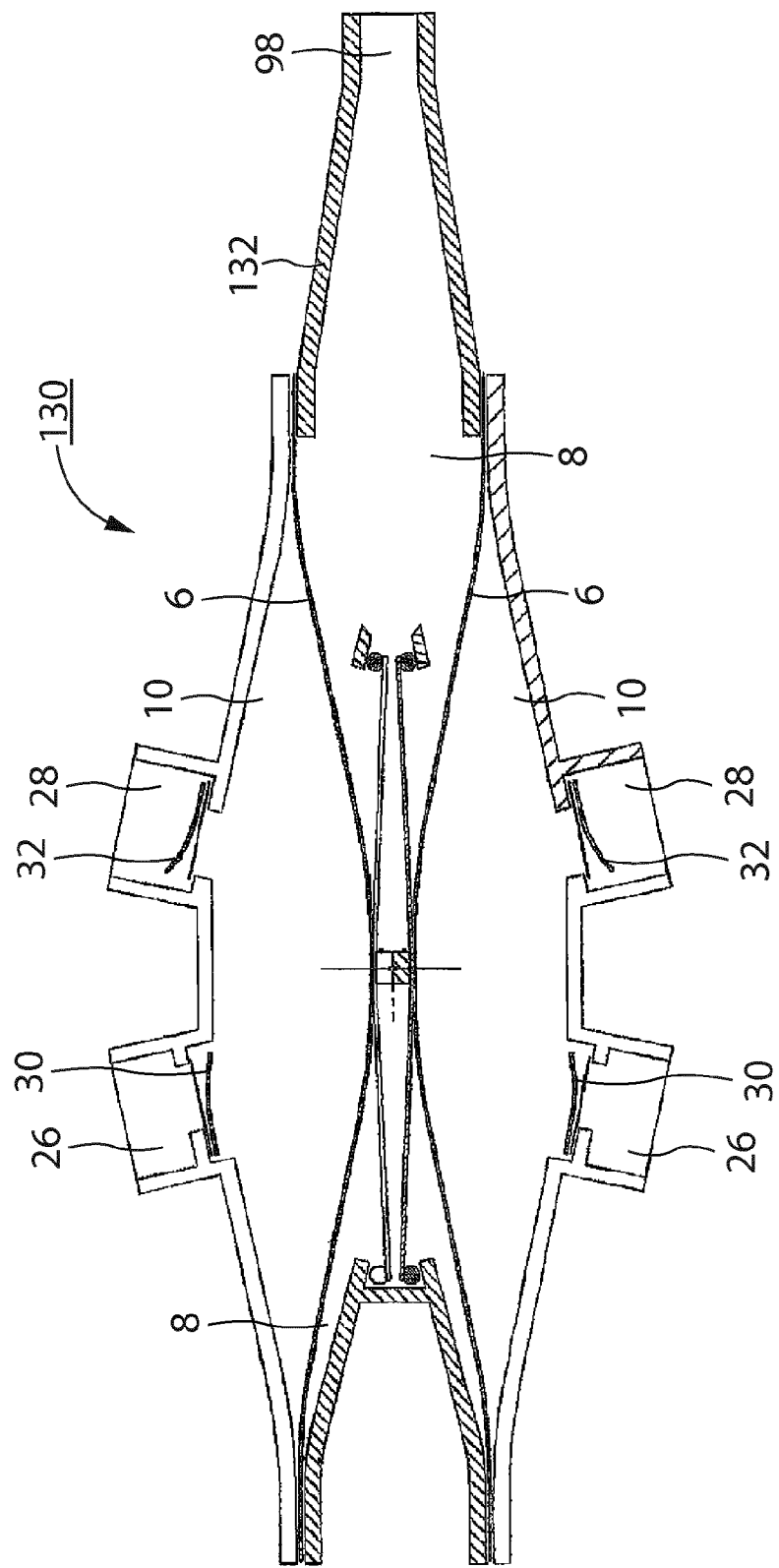
FIG. 12 is a cross section of a membrane pump unit.

As is indicated in FIG. 12, in this embodiment in this context the diffuser is implemented by way of the funnel-like or frustum-like shaping of the housing cover 12, in accordance with the variant shown in FIG. 1 of the membrane pump 1. Naturally, however, all other variants shown for the configuration of the membrane pump 1, 1', 1" are also advantageous and favourable.

Alternatively or in addition, however, the diffuser provided according to the invention for introducing the exhaust gas pressure wave into the membrane pump 1 may also be implemented by way of a corresponding configuration of the branch line 98 itself. In this variant, which is inventive in its own right, the branch line 98 comprises, in the opening region thereof into the membrane pump 1, a free cross-sectional area which is increased by at least one-and-a-half times by comparison with the connection point thereof to the pulse switch 96

A particularly advantageous variant of the invention, which is based on a configuration of this type of the branch line 98 as a diffuser element and which is particularly favourable and suitable in particular for applications in multi-cylinder engines, is shown schematically in FIG. 12. In this context, a plurality of components of individual membrane pumps are interconnected and combined in a membrane pump unit 130 so as to achieve a greater pump volume. In this context, arrangements are advantageous in which the chambers having like function are combined. In particular, in this context a shared sub-volume 8 forming the primary volume for two or more secondary volumes is provided, and is delimited by a resiliently deformable membrane 6 on each of the two sides. The sub-volume 8 is connected on the drive gas side to the branch line 98, which widens in cross section directly upstream from the opening into the sub-volume 8 and thus forms the diffuser region 132. Thus, in this case too, a diffuser-like pipe progression is provided in the inflow region, the line cross section of which increases towards the primary side of the membrane pump and in this embodiment takes on an approximately rectangular cross section.

On the secondary side, in this example a sub-volume 10 forming the secondary side is arranged on each of the two sides of the sub-volume 8, is in each case separated in a gas-tight manner from the first sub-volume 8 by way of the associated membrane 6, and is in each case connected—analogously to the above examples—via a fresh gas pressure duct/suction duct 26, 28 into the fresh gas tract of an associated cylinder of a combustion engine. Thus, via the membrane pump unit 130, for example two cylinders of the combustion engine can be supplied with pre-compressed fresh gas simultaneously, merely one branch line 98 along with the associated primary-side sub-volume 8 being required.

For example, a shared housing cover may be provided for the two pump units. A double chamber of this type on the side of the working gas makes it possible for the drive gas advantageously to flow laterally to the centre of the membranes 6. The desired pressure progression can thus be achieved.

So as even further to improve the desired energy transfer from drive gas to the membrane 6 by pulse transmission, for example in the embodiment of FIG. 7, the gas mass is advantageously selected suitably in terms of the membrane mass. Preferably, the gas mass and the membrane mass, including all moving masses connected to the membrane 6, are approximately equal. Since in practice the membrane mass often turns out greater than the gas mass located in the pressure wave, the gas mass which ultimately acts on the membrane 6 can be increased by way of the gas cushion located in the branch line 98. The gas mass located in the diffuser is also counted towards this gas cushion. The pulse of a pressure wave which thus enters the branch line 98 arrives at the gas mass located in the branch line 98 and the diffuser and accelerates it, increasing the total gas mass but causing the gas speed of the total gas mass to be lower than that of the initially entering pressure wave. However, the pulse is still approximately maintained, with the result that the gas mass and the membrane mass have become relatively close and there is a higher energy transfer to the membrane.

The portion of the pulse of the drive gas which is not transmitted to the membrane 6 arrives as a reflected gas mass. The diffuser upstream from the membrane is helpful for exploiting the residual pulse of the drive gas for energy transfer to the membrane 6, since said diffuser causes the gas flow to arrive at the membrane 6 in a cone shape and thus causes the reflected gas molecules to have a radial component which causes them to run radially outwards towards the housing edge, with a further pulse transfer between the membrane 6 and the housing cover 12, in such a way that the static gas pressure further increases here.

Since in the embodiment the membrane pump 1 is operated with hot drive gas, specifically the exhaust gas from the combustion engine 70, the branch line 98 including the diffuser for the working chamber is advantageously 1.5 to 3 times greater in volume than the pump volume of the membrane pump 1. The gas column present upstream from the membrane 6 in the branch line 98 and/or the diffuser as a result forms thermal insulation against the hot exhaust gas of the combustion engine 70. The hot pressure wave is prevented from arriving directly at the membrane 6 by this upstream gas column.

The branch line 98 may additionally be cooled if required to reduce the temperature of the drive gas in the membrane pump 1. Advantageously, the branch line 98 for the membrane pump 1 branches from the line carrying the exhaust gas directly at the cylinder head of the associated combustion engine 70, 70', 70", 70''', 70'''', as is shown in each of FIGS. 7 to 11. For low losses of the driving pressure wave, this branch should in principle be attached as close as possible to the point of origin of the gas pulses, for example at the outlet duct of an engine cylinder head. The branch is advantageously configured in such a way that the gas pulse entering the branch predominantly runs into the branch of the branch line 98 for the membrane pump 1, for example to lay straight pipe passages in the pumping direction, or in the event of curvatures in the branch to lay the gas outlet to the silencer on the inside of the curve of the pump branch.

The above-described combustion engine 70, 70', 70", 70''', 70'''' can be configured in various manners. The following (individually or in combination) are each considered particularly favourable and inventive in their own right:

- configuring the combustion engine 70, 70', 70", 70''', 70'''' as a single-cylinder engine,
- configuring the combustion engine 70, 70', 70", 70''', 70'''' as a two-cylinder engine,
- configuring the combustion engine 70, 70', 70", 70''', 70'''' as an engine having at least three cylinders 72,
- configuring the combustion engine 70, 70', 70", 70''', 70'''' as a two-cycle engine,
- configuring the combustion engine 70, 70', 70", 70''', 70'''' as a four-cycle engine,
- configuring the combustion engine 70, 70', 70", 70''', 70'''' as an engine of which the cylinders 72 each have an individual cylinder capacity of at most 250, preferably at most 200 cc,
- configuring the combustion engine 70, 70', 70", 70''', 70'''' as an engine for hydrogen as a fuel,
- use of the combustion engine 70, 70', 70", 70''', 70'''' in a motorcycle,
- use of the combustion engine 70, 70', 70", 70''', 70'''' in an all-terrain vehicle (ATV).

LIST OF REFERENCE NUMERALS 1, 1', 1" Membrane pump
2 Pressure housing
4 Internal volume
6 Membrane
8, 10 Sub-volume
12, 14 Housing cover
16 Stop
18 Contact disc
20 Spring
22 Inflow face
274 Inlet and outlet duct
26 Fresh gas suction duct
28 Fresh gas pressure duct
30, 32 Check valve
34 Inner surface
36 Leaf spring
38 Free end
39 Inner face
40 Diffuser region
42 Frustum
44 Central axis
46 Depression
48 End edge
49 Sub-region
50 Membrane edge
52, 54 O-ring
56 Spring
58 Spring seat
60 Guide pin
62 Sliding bearing
70, 70',
70", 70''',
70'''' Combustion engine
72 Cylinder
74 Working piston
76 Piston rod
78 Crankshaft
80 Combustion chamber
82 Exhaust system
84 Gas inlet system
86 Inlet valve system
88 Inlet valve
90 Exhaust gas tract
92 Outlet valve system
94 Outlet valve
96 Pulse switch
98 Branch line
102 Exhaust gas line
106 Fresh gas line
108 Charge air cooler
110 Primary duct
112 Exhaust gas duct
120 Additional valve
122 Check valve
124 Fresh air line
130 Membrane pump unit
132 Diffuser region

The invention claimed is:

1. A membrane pump for use in an exhaust gas tract of a combustion engine, comprising a pressure housing, the internal volume of which is subdivided by a one or more resiliently deformable membranes into an exhaust-side sub-volume into which exhaust is permitted to pass and a fresh gas-side sub-volume through which a gas flows, wherein a biasing force is applied to the one or more membranes in such a way that in a pressure-free state the exhaust-side sub-volume has a minimum volume in relation to a deformability of the one or more membranes, and wherein a leaf spring is provided as a restoring spring for applying the biasing force to the one or more membranes.

2. The membrane pump of claim 1, wherein the leaf spring provided for applying the biasing force to the one or more membranes is arranged in the exhaust-side sub-volume.

3. The membrane pump of claim 1, wherein the leaf spring is connected to the one or more membranes centrally.

4. The membrane pump of claim 1, wherein the leaf spring is braced movably on the pressure housing at free spring ends thereof.

5. The membrane pump of claim 1, wherein the leaf spring is formed from a fibre composite material.

6. The membrane pump of claim 1, wherein the leaf spring has a central sub-region connected to the one or more membranes, and wherein the width of the central sub-region is greater than the width of an outer edge region of the leaf spring.

7. The membrane pump of claim 1, wherein the leaf spring is prefabricated with a curved shaping.

8. The membrane pump of claim 1, wherein the one or more membranes is formed prefabricated with a curved shaping to minimize the volume of the exhaust-side sub-volume in the pressure-free state.

9. The membrane pump of claim 1, in which the one or more membranes are movably gripped in the pressure housing at an edge of the one or more membranes.

10. The membrane pump of claim 1, comprising a stop for the one or more membranes within the exhaust-side sub-volume and delimiting the exhaust-side sub-volume.

11. The membrane pump of claim 1, in which an inner face of the exhaust-side sub-volume has a continuously widening cross section in a diffuser region extending from an inflow face towards the one or more membranes wherein a point of the membrane protruding furthest into the exhaust-side sub-volume is spaced apart from the inflow face by at least 5 mm in the pressure-free state.

12. A combustion engine comprising one or more cylinders in each of which a working piston, acting on a shared crankshaft, is guided, wherein a combustion chamber of each cylinder is connected to a gas inlet system via an actuable inlet valve system on an inlet side of the cylinder, is connected to an exhaust system and via a branch line to the exhaust-side sub-volume of the membrane pump of claim 1, wherein the fresh gas-side sub-volume of the membrane pump is connected to the gas inlet system, and is connected to an actuable outlet valve system via a pulse switch on the outlet side of the cylinder.

13. The combustion engine of claim 12 wherein the branch line connecting the membrane pump to the pulse switch has, in an opening region thereof into the membrane pump, a free cross-sectional area which is increased by at least one-and-a-half times by comparison with a connection point thereof to the pulse switch.

14. The combustion engine of claim 13, in which the branch line, configured as a diffuser having a cross section which widens away from the pulse switch in a flow direction of the gas, opens on the outlet side into a membrane pump unit, in which a plurality of fresh gas-side sub-volumes separated from one another are assigned to a shared exhaust-side sub-volume in a shared housing cover.

15. The combustion engine of claim 12, in which the gas cushion volume jointly formed by the exhaust-side sub-volume and/or by the internal volume of the branch line is at least 1.5 times the pump volume of the membrane pump.

16. The combustion engine of claim 12, configured as a single-cylinder engine.

17. The combustion engine of claim 12, configured as a two-cylinder engine.

18. The combustion engine of claim 12, comprising at least three cylinders.

19. The combustion engine of claim 12, configured as a two-cycle engine.

20. The combustion engine of claim 12, configured as a four-cycle engine.

* * * * *